US006711730B2

(12) United States Patent
Frank et al.

(10) Patent No.: US 6,711,730 B2
(45) Date of Patent: Mar. 23, 2004

(54) SYNTHESIZING SIGNAL NET INFORMATION FROM MULTIPLE INTEGRATED CIRCUIT PACKAGE MODELS

(75) Inventors: Mark D. Frank, Longmont, CO (US); William Bryson McHardy, Ft. Collins, CO (US); Peter Shaw Moldauer, Wellington, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 36 days.

(21) Appl. No.: 10/179,077

(22) Filed: May 13, 2002

(65) Prior Publication Data

US 2003/0212980 A1 Nov. 13, 2003

(51) Int. Cl.[7] ............................................. G06F 17/50
(52) U.S. Cl. ................................ 716/18; 716/17; 716/6
(58) Field of Search ................................ 716/1, 2, 8, 9, 716/10, 11, 12, 13, 14, 15, 18, 17, 16, 19

(56) References Cited

U.S. PATENT DOCUMENTS

| | | | |
|---|---|---|---|
| 5,349,659 A | 9/1994 | Do et al. ..................... | 395/700 |
| 5,383,132 A | 1/1995 | Shinohara et al. ........... | 364/491 |
| 5,396,435 A | 3/1995 | Ginetti ........................ | 364/489 |
| 5,426,591 A | 6/1995 | Ginetti et al. ................ | 364/489 |
| 5,510,998 A | 4/1996 | Woodruff et al. ............ | 364/489 |
| 5,559,718 A | 9/1996 | Baisuck et al. .............. | 364/491 |
| 5,590,049 A | 12/1996 | Arora ......................... | 364/489 |
| 5,608,645 A | 3/1997 | Spyrou ....................... | 364/491 |
| 5,726,902 A | 3/1998 | Mahmood et al. ........... | 364/489 |
| 5,825,658 A | 10/1998 | Ginetti et al. ................ | 364/488 |
| 5,880,967 A | 3/1999 | Jyu et al. ..................... | 364/489 |
| 5,896,300 A | 4/1999 | Raghavan et al. ........... | 364/491 |
| 5,956,257 A | 9/1999 | Ginetti et al. ................ | 364/490 |
| 6,093,214 A * | 7/2000 | Dillon .......................... | 716/17 |
| 6,182,258 B1 | 1/2001 | Hollander .................... | 714/739 |
| 6,189,131 B1 * | 2/2001 | Graef et al. .................. | 716/8 |

(List continued on next page.)

FOREIGN PATENT DOCUMENTS

WO   WO 98/53413   11/1998   ........... G06F/17/50

OTHER PUBLICATIONS

"Alternate Verilog FAQ," Version 9.13, http://www.angelfire.com/in/verilogfaq/index.html (Jun. 2001).
"Advanced Package Designer," Cadence Design Systems, Inc. (2000).
"Advanced Package Engineer," Cadence Design Systems, Inc. (2000).
"What's New in IC Packaging," Cadence Design Systems, Inc. (2000).
"Cadence PCB Design" Brochure, Cadence Design Systems, Inc. (2002).
"Pacific Numerix Joint Solution With Cadence," Cadence Design Systems, Inc. (1998).
"BSDArchitect New Edition", Metor Graphics Corporation (2000).

Primary Examiner—Vuthe Siek
Assistant Examiner—Binh Tat

(57) ABSTRACT

Techniques are disclosed for automatically synthesizing information from a plurality of computer-readable integrated circuit package models. In one embodiment, each of the plurality of package models contains information descriptive of a distinct package. Such information may include, for example, intra-package path lengths and/or propagation delays of signal nets in the modeled packages. Techniques are disclosed for automatically synthesizing such information to produce, for example, aggregate path lengths and/or propagation delays of the signal nets across all of the modeled packages. Such synthesis may be performed even when the package models use mutually inconsistent signal net naming conventions and the modeled packages are composed of different materials. Techniques are also disclosed for providing information to the package designer to assist the package designer in improving the design of the package models.

24 Claims, 17 Drawing Sheets

U.S. PATENT DOCUMENTS

| | | | |
|---|---|---|---|
| 6,212,666 B1 | 4/2001 | Gohl et al. | 716/6 |
| 6,233,724 B1 | 5/2001 | LaBerge | 716/18 |
| 6,247,163 B1 | 6/2001 | Burch et al. | 716/3 |
| 6,253,361 B1 * | 6/2001 | Buch | 716/6 |
| 6,263,483 B1 | 7/2001 | Dupenloup | 716/18 |
| 6,282,693 B1 | 8/2001 | Naylor et al. | 716/8 |
| 6,289,491 B1 | 9/2001 | Dupenloup | 716/5 |
| 6,301,578 B1 | 10/2001 | Harris | 707/101 |
| 6,301,693 B1 | 10/2001 | Naylor et al. | 716/10 |
| 6,308,299 B1 | 10/2001 | Biurch et al. | 716/4 |
| 6,311,318 B1 | 10/2001 | Souef et al. | 716/18 |
| 6,324,675 B1 | 11/2001 | Dutti et al. | 716/13 |
| 6,327,692 B1 * | 12/2001 | Brown | 716/1 |
| 6,336,206 B1 | 1/2002 | Lockyear | 716/7 |
| 2001/0005898 A1 | 6/2001 | Yamamoto et al. | 714/815 |
| 2001/0010090 A1 | 7/2001 | Boyle et al. | 716/2 |
| 2001/0016933 A1 | 8/2001 | Chang et al. | 716/1 |
| 2001/0032331 A1 | 10/2001 | LaBerge | 716/18 |
| 2001/0034873 A1 | 10/2001 | Arsintescu | 716/8 |
| 2001/0052107 A1 | 12/2001 | Anderson | 716/4 |
| 2002/0004931 A1 | 1/2002 | Stralen | 716/18 |
| 2003/0110462 A1 * | 6/2003 | Cohn et al. | 716/6 |

* cited by examiner

SYNTHESIZING SIGNAL NET INFORMATION FROM MULTIPLE INTEGRATED CIRCUIT PACKAGE MODELS

BACKGROUND

1. Field of the Invention

The present invention relates to integrated circuit package design and, more particularly, to synthesizing information about signal nets from multiple integrated circuit package models.

2. Related Art

Integrated circuits (ICs) are becoming increasingly large and complex, typically including millions of individual circuit elements such as transistors and logic gates. As a result of this increased size and complexity, IC designers are increasingly using electronic design automation (EDA) software tools to assist with IC design. Such tools help to manage the complexity of the design task in a variety of ways, such as by allowing ICs to be designed hierarchically, thereby enabling the design to be divided into modules and enabling the design task to be divided among multiple designers in a manner that limits the complexity faced by any one designer.

Various hardware description languages (HDLs) have been developed which allow circuit designs to be described at various levels of abstraction. A description of a circuit according to an HDL (referred to herein as an "HDL model" of the circuit) may, for example, describe a particular circuit design in terms of the layout of its transistors and interconnects on an IC, or in terms of the logic gates in a digital system. Descriptions of a circuit at different levels of abstraction may be used for different purposes at various stages in the design process. HDL models may be used for testing circuits and circuit designs, as well as for fabricating the circuits themselves. The two most widely-used HDLs are Verilog and VHDL (Very High Speed Integrated Circuits (VHSIC) Hardware Description Language), both of which have been adopted as standards by the Institute of Electrical and Electronics Engineers (IEEE). VHDL became IEEE Standard 1076 in 1987 and Verilog became IEEE Standard 1364 in 1995.

EDA tools are typically capable of converting a functional HDL description of a circuit design into a specific circuit implementation. The specific circuit implementation may be represented by a "netlist," which identifies both the elements of the circuit and the interconnections among them. In general, a netlist describes the circuit design in terms of nodes and edges. Each node represents a circuit element and each edge represents an interconnection between two circuit elements. Netlists may describe circuits at various levels of abstraction. A netlist may, for example, describe circuit elements in terms of specific structural components (such as resistors and transistors) or in terms of high-level "cells" that may be decomposed into specific structural components and/or other cells. A netlist may, for example, describe the connections between cells in terms of specific cell-to-cell pin connections.

EDA tools are typically capable of converting a netlist into a physical layout of the circuit. The layout process involves both "placement" (assigning specific coordinates in the circuit layout to each cell) and "routing" (wiring or connecting cells together). The layout produced thereby defines the specific dimensions and coordinates of the gates, interconnects, contacts, and other elements of the circuit. The layout may have multiple layers, corresponding to the layers of the circuit. The layout may be used to form a mask, which in turn may be provided to a foundry to fabricate the integrated circuit itself.

One stage in the process of IC design is package design, which refers to the design of substrates (packages) for interconnecting layers of the IC. An IC typically includes multiple packages interconnected in layers. Each package, in turn, may include multiple layers. Packages within a single IC may be composed of varying materials having varying electrical properties. Individual signal nets (also referred to herein simply as "nets") in the IC may be distributed across multiple packages. A package design must ensure that signals in the IC have sufficient power and maintain sufficient signal integrity when passing from one layer of the IC to another. As used herein, the term "signal net" (or simply "net") refers to a collection of conductors that are connected to form a complete circuit connecting at least one output to at least one input.

As with IC design more generally, various tools exist for automating aspects of IC package design. Such tools typically provide a graphical user interface through which package designers may visually design the IC package in three dimensions. One such tool is Advanced Package Designer (APD), available from Cadence Design Systems, Inc. of San Jose, Calif. APD is a software program which allows the package designer to model the physical, electrical, and thermal characteristics of the package substrate. An APD package design database may be provided to a foundry to be used directly as manufacturing input for fabrication of the designed package.

Referring to FIG. 1, relevant features of a conventional system 100 for designing IC packages are illustrated in block diagram form. A package design tool (not shown), such as APD, maintains a plurality of package models 102a–n, each of which contains information defining a particular package in an IC design. The package models 102a–n may include, for example, information specifying the name, location, and length of each signal trace in each layer of the package models 102a–n. Each of the package models 102a–n is typically stored in a distinct database file in a computer system.

Package design tools typically allow a package designer to access and modify only a single one of the package models 102a–n at a time. To modify a particular one of the package models 102a–n, the package designer must typically use the package design tool to open the database file corresponding to the package model to be modified. Upon opening one of the package models 102a–n, the package design tool may provide a graphical user interface which displays a two-dimensional or three-dimensional representation of the package model and which allows the package designer to modify the package model. Techniques for creating and modifying packages using such package design tools are well-known to those of ordinary skill in the art. To modify a different one of the package models 102a–n, the package designer must typically close the current package model and use the package design tool to open the other package model.

Package design tools are typically capable of generating various kinds of reports containing information about the package models 102a–n. One such report is a net length report, which contains information about the package-specific (intra-package) path length of each signal net within a particular one of the package models 102a–n. In other words, for each signal net within a particular package, the net length report indicates the length of that portion of the signal net which runs through the package. Such a report is therefore referred to herein as a "package-specific net length report."

For example, as shown in FIG. 1, a net length report generator 104 (which may, for example, be part of the package design tool that was used to design the package models 102a–n) generates package-specific net length reports 108a–n, each of which contains the package-specific path lengths of signal nets within a corresponding one of the package models 102a–n. For example, package-specific net length report 108a contains the package-specific path lengths of signal nets within package model 102a.

The package-specific net length reports 108a–n may include various kinds of information about the path lengths of signal nets in the package models 102a–n. In their simplest form, for example, each of the package-specific net length reports 108a–n may contain a list of the names of all of the signal nets in the corresponding package model and the path length of each such signal net within the corresponding package model. A more detailed report may include information not only about the path length of each signal net within a package, but also information about the length of each signal net within each layer of the package.

It is often desirable or necessary to synthesize information about multiple ones of the package models 102a–n. For example, it may be desirable or necessary to calculate the total path lengths of signal nets through all of the package models 102a–n, or to calculate the total propagation delays of signal nets through all of the package models 102a–n. Such information synthesis is useful, for example, to perform length equalization (also referred to as "skew equalization"), which involves equalizing the path lengths of multiple signal nets in a group of signal nets. It may also be desirable to ensure that signal nets within particular signal net groups have the same total propagation delay through the IC within a specified tolerance. Conventional package design tools typically are not capable of performing such information synthesis automatically because they operate on only one of the package models 102a–n at a time. As a result, it typically is necessary for package designers to calculate total signal net path lengths and propagation delays manually, which is a tedious, time-consuming, and error-prone process.

What is needed, therefore, are improved techniques for synthesizing information about signal nets from multiple package models.

SUMMARY

Techniques are disclosed for automatically synthesizing information from a plurality of computer-readable integrated circuit package models. In one embodiment, each of the plurality of package models contains information descriptive of a distinct package. Such information may include, for example, intra-package path lengths and/or propagation delays of signal nets in the modeled packages. Techniques are disclosed for automatically synthesizing such information to produce, for example, aggregate path lengths and/or propagation delays of the signal nets across all of the modeled packages. Such synthesis may be performed even when the package models use mutually inconsistent signal net naming conventions and the modeled packages are composed of different materials. Techniques are also disclosed for providing information to the package designer to assist the package designer in improving the design of the package models.

In one aspect of the present invention, a method is provided for use in a system is provided which includes a plurality of models of integrated circuit packages. The plurality of models include package-specific values of a property (such as signal net path length and/or signal net propagation delay) of a plurality of signal nets in the integrated circuit packages. The method includes steps of: (A) selecting a first one of the plurality of signal nets; (B) selecting, from a first one of the plurality of models, a first package-specific value of the property of the first signal net; (C) selecting, from a second one of the plurality of models, a second package-specific value of the property of the first signal net; and (D) applying a synthesis function (such as addition) to the first and second package-specific values to produce a synthesized property value.

In another aspect of the present invention, a method is provided for use in a system including a plurality of property values of a plurality of signal nets in an integrated circuit. The method includes steps of: (A) identifying a reference value r; and (B) for each property value S in the plurality of property values (e.g., signal net path lengths and/or signal net propagation delays), performing steps of: (1) determining whether property value S differs from reference value r by more than a predetermined amount; and (2) notifying a user of the system if it is determined that the property value S differs from the reference value r by more than the predetermined amount. The reference value r may be selected from among the plurality of property values.

In yet another aspect of the present invention, a method is provided for use in a system including a plurality of property values of a plurality of signal nets in an integrated circuit. The method comprises steps of: (A) identifying a reference value r; and (B) for each property value S in the plurality of property values, performing steps of: (1) identifying a difference D between property value S and reference value r; and (2) notifying a user of the system of the difference D.

Other features and advantages of various aspects and embodiments of the present invention will become apparent from the following description and from the claims.

DETAILED DESCRIPTION

Figure 2:
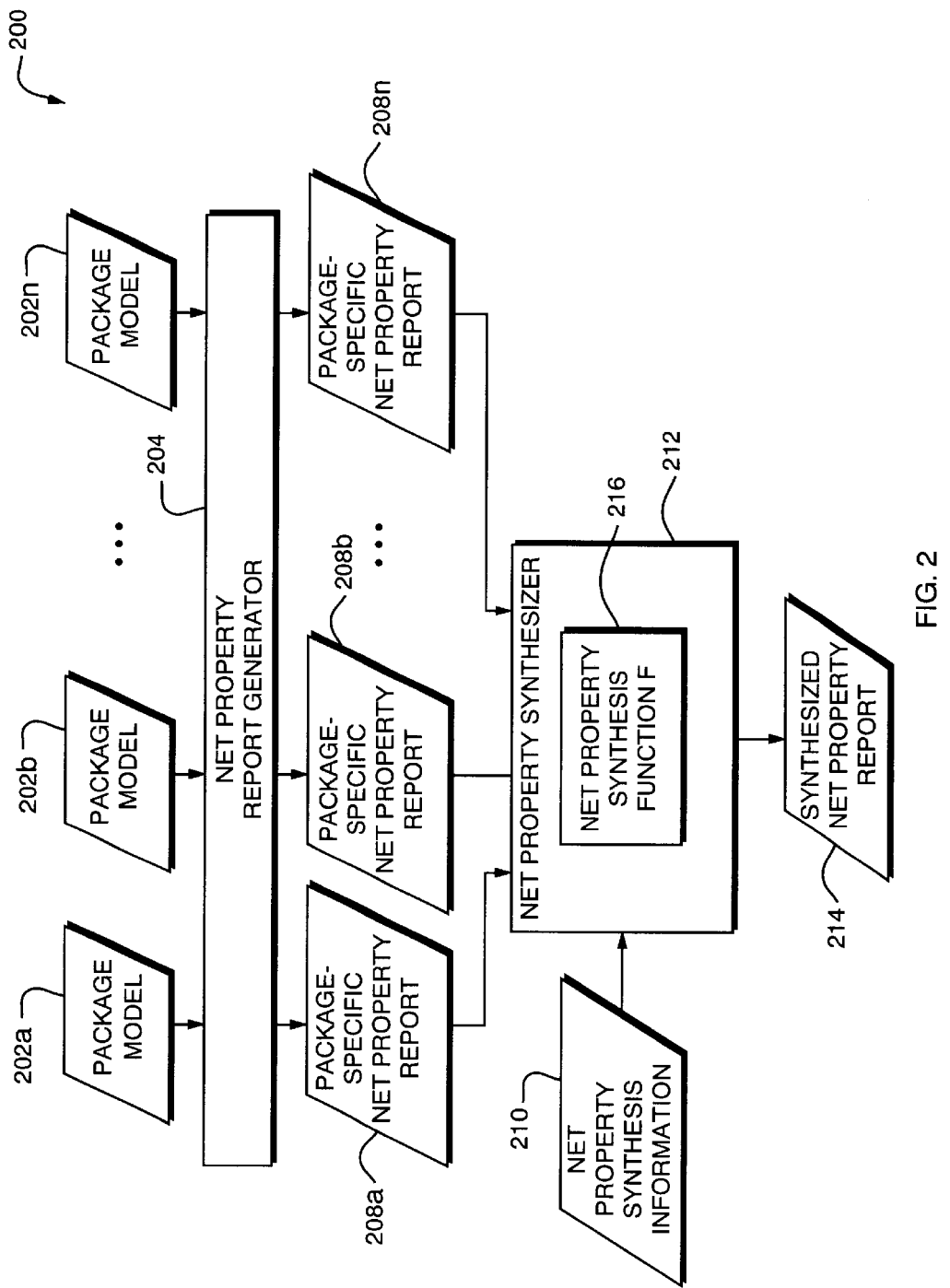
FIG. 2 is a functional block diagram of a system for synthesizing signal net information from multiple integrated circuit package models according to one embodiment of the present invention.

Referring to FIG. 2, a system 200 is illustrated for synthesizing signal net information from a plurality of IC package models 202a–n according to one embodiment of the present invention. As described above, a particular integrated circuit may include a plurality of interconnected packages arranged in layers. In the system 200 shown in FIG. 2, each of the package models 202a–n is a model of a particular IC package in a design for a particular integrated circuit. The package models 202a–n may, for example, be created and maintained using a package design tool, such as the Advanced Package Designer (APD) software described above. Package design tools such as APD typically maintain a distinct model (in the form of a database) for each package in the IC design.

Figure 1:
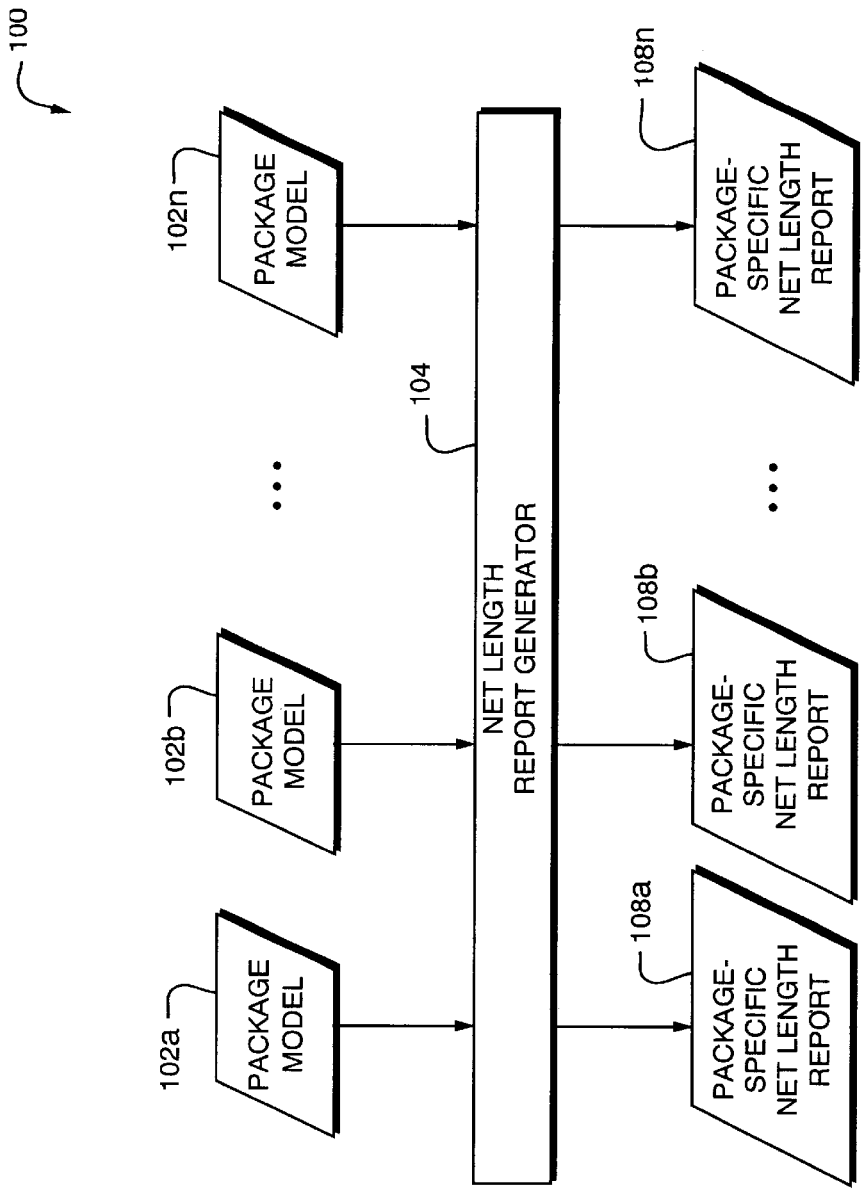
FIG. 1 is a functional block diagram of a prior art system for generating package-specific net length reports describing the lengths of signal nets within packages of an IC design.

The package design tool includes a net property report generator 204, which may, for example, be a package-specific net length report generator as described above with respect to FIG. 1. In general, the net property report generator 204 generates package-specific net property reports 208a–n, each of which corresponds to a particular one of the package models 202a–n. For each of the package models 202a–n, the net property report generator 204 extracts the value of a particular property (referred to herein as "the reported property") of each of the signal nets in the package model, and includes the extracted property values in the corresponding net property report. Reported properties may include, for example, the path length or propagation delay of signal nets within a particular package.

The value of a particular signal net property for a particular package model is referred to herein as a "package-specific property value" or as an "intra-package property value." The package-specific net property report 208a may, for example, include the package-specific path lengths of the signal nets in package model 202a.

In one embodiment of the present invention, a net property synthesizer 212 is provided which synthesizes information contained in the plurality of package-specific net property reports 208a–n into a single synthesized property report 214 based on property synthesis information 210. If, for example, the reported property is path length, the synthesized property report 214 may include a list of the synthesized (i.e., total) path lengths of each of one or more of the signal nets through all of the packages modeled by the package models 202a–n. More specifically, the net property synthesizer 212 includes a net property synthesis function F 216 which the net property synthesizer 212 may use to synthesize the package-specific property values for each signal net into corresponding "synthesized property values" that are stored in the synthesized property report 214.

Figure 3A:
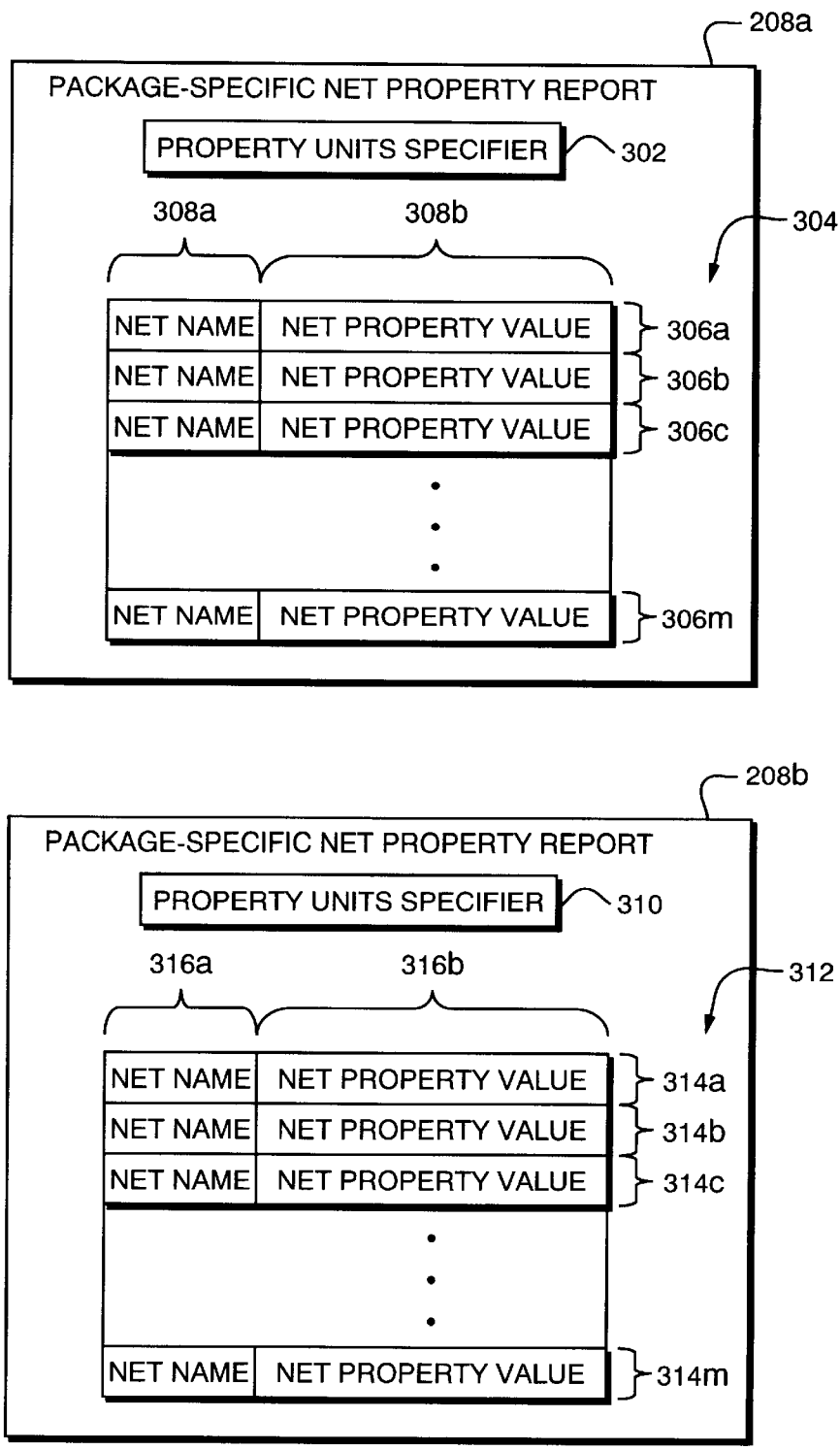
FIG. 3A is a block diagram of the logical structure of two package-specific net property reports generated by an integrated circuit package design tool.

Operation of the system 200 according to various embodiments of the present invention will now be described in more detail. Referring to FIG. 3A, examples of the logical structure of two of the package-specific net property reports 208a and 208b are illustrated in more detail. Net property reports having the logical structure illustrated in FIG. 3A may be generated by conventional package design tools, such as APD. The package-specific net property reports 208a and 208b may, for example, report on the path lengths or propagation delays of particular signal nets within the corresponding packages.

The package-specific net property report 208a (which reports on the package model 202a) includes a net property value list 304, which lists the values of the reported property (e.g., path length or propagation delay) for the signal nets within the corresponding package (i.e., the package modeled by package model 202a). The list 304 includes a plurality of list elements 306a–m, where m is the number of elements in the list (i.e., the number of signal nets reported on by the report 208a). Each of the list elements 306a–m includes a net name field 308a and a net property value 308b field. In each of the list elements 306a–m, the net name field 308a identifies the name of a particular signal net within the corresponding package, and the net property value field 308b indicates the value of the reported property for the signal net identified by the net name field 308a. For example, if the reported property is signal net path length, then each of the list elements 306a–m indicates the name of a particular signal net and the path length of that signal net within the corresponding package.

The package-specific net property report 208a also includes a property units specifier 302 which specifies the units in which the net property values 308b are expressed. Path lengths may, for example, be expressed in units of millimeters, mils, or microns in a particular report. The property units specifier 302 specifies the units in which the net property values 308b are expressed so that the net property values 308b may be interpreted either by a human operator or by the net property synthesizer 212 (FIG. 2), as described in more detail below.

The package-specific net property report 208b has the same logical structure as the package-specific net property report 208a. More specifically, the package-specific net property report 208b includes a net property value list 312, which lists the values of the reported property for a plurality of nets within the corresponding package (in this case, the package modeled by package model 202b). The list 312 includes a plurality of list elements 314a–m. Each of the list elements 314a–m includes a net name field 316a and a net property value 316b field. Although the lists 304 and 312 in FIG. 3 have the same number of elements (m), this is not a requirement of the present invention. Rather, the lists 304 and 312 may have different numbers of elements. The package-specific net property report 208b also includes a property units specifier 310 which specifies the units in which the net property values 316b are expressed.

The net property values 308b in report 208a and the net property values 316b in report 208b may be expressed in the same or in different units (indicated by the property units specifiers 302 and 310, respectively). Typically, the user of the net property report generator 204 specifies the units in which net property values in a particular report should be expressed. The package-specific net property reports 208a–n may, for example, be implemented as text files, elements of which (such as the property units specifier 302 and the property units specifier 310) may be implemented as text strings, as will be well-understood by those of ordinary skill in the art.

As described in more detail below with respect to FIG. 5, the net property synthesizer 212 (FIG. 2) uses the net property value lists and the property unit specifiers in the package-specific net property reports 208a–n to generate a synthesized net property value list in the synthesized property report 214. Before describing how this operation may be performed, one embodiment of the property synthesis information 210 will be described in more detail.

Figure 4A:
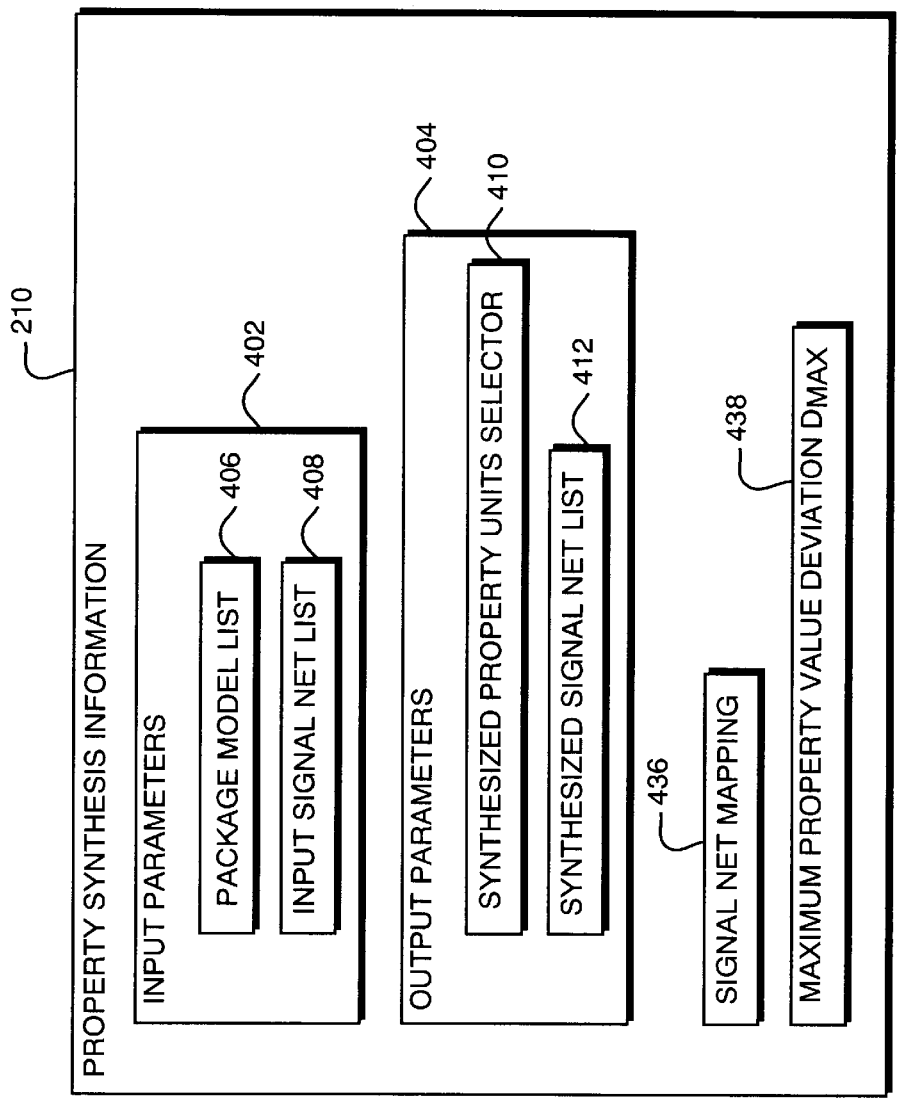
FIG. 4A is a is a block diagram of the logical structure of property synthesis information that is used to synthesize package-specific signal net property information according to one embodiment of the present invention.

Referring to FIG. 4A, the logical structure of the property synthesis information 210 is illustrated according to one embodiment of the present invention. In general, the property synthesis information 210 includes information for: (1) identifying the package models 202a–n from which signal net property values should be synthesized; (2) selecting one or more signal nets within the identified package models 202a–n for which signal net property values should be synthesized; and (3) specifying the format of the synthesized property report 214 to be generated by the net property synthesizer 212.

More specifically, in one embodiment, the property synthesis information 210 includes input parameters 402 and output parameters 404. The input parameters 402 include a package model list 406 and an input signal net list 408. The package model list 406 lists the package models 202a–n from which signal net property values are to be synthesized by the net property synthesizer 212. The package models 202a–n may, for example, be a subset of the package models in a complete IC design. The package model list 406 may, for example, identify the package models 202a–n using the filenames of the database files containing the package models 202a–n or using the filenames of the package-specific net property reports 208a–n corresponding to the package models 202a–n. The package model list 406 may include additional information about each of the package models 202a–n, as described in more detail below with respect to FIG. 4C.

The input signal net list 408 lists the signal nets for which property values are to be synthesized by the net property synthesizer 212. It may be desirable, for example, to synthesize property values for only certain signal nets, and the input signal net list 408 provides a mechanism for doing so. The input signal net list 408 may, for example, identify signal nets using the same net names as the net names 308a and 316a used by the package-specific net property reports 208a–b, respectively (FIG. 3A).

In one embodiment, the output parameters 404 include a synthesized property units selector 410 and a synthesized signal net list 412. The synthesized property units selector 410 specifies the units in which synthesized property values should be expressed in the synthesized property report 214. As described above, package-specific property values may be expressed in different units in different ones of the package-specific net property reports 208a–n. The synthesized property units selector 410 may select a unit of measurement that is employed by one or more of the package-specific net property reports 208a–n or may select a unit of measurement that is not employed by any of the package-specific net property reports 208a–n.

The synthesized signal net list 412 lists the names that should be used to identify signal nets in the synthesized property report 214. The synthesized signal net list 412 may, for example, specify the same or different names than those used in the package models 202a–n. In certain embodiments, such as when all of the package models 202a–n use the same set of signal net names, the synthesized signal net list 412 may be omitted from the net property synthesis information 210 and the net property synthesizer 212 may name the signal nets in the synthesized net property report 214 using the names provided in the input signal net list 408.

As described in more detail below with respect to FIG. 4B, a particular signal net may span more than one of the package models 202a–n, but may have different signal net names in different ones of the package models 202a–n. In such a case, the net property synthesis information 210 may include a mapping 436 between signal names used in the package-specific net property reports 208a–n and signal names to be used to identify signal nets in the synthesized net property report 214.

Figure 6:
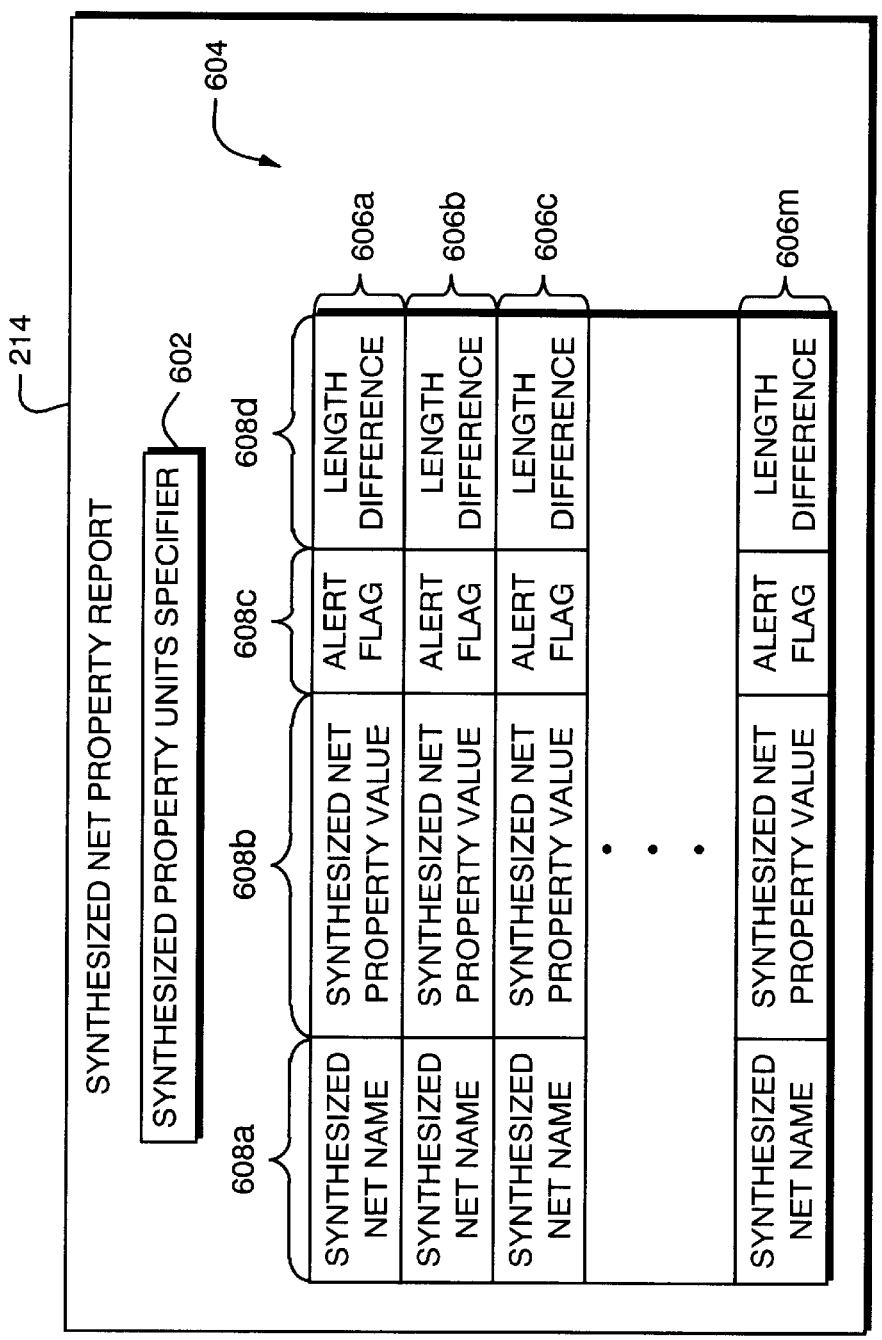
FIG. 6 is a block diagram of the logical structure of a synthesized signal net property report according to one embodiment of the present invention.

Referring to FIG. 6, an example of the logical structure of the synthesized net property report 214 is illustrated according to one embodiment of the present invention. The synthesized net property report 214 includes a synthesized net property value list 604, which lists the synthesized property values generated by the net property synthesizer 212 by synthesizing the package-specific property values contained in the package-specific net property reports 208a–n. The list 604 includes a plurality of list elements 606a–m, where m is the number of elements in the list (i.e., the number of signal nets synthesized by the net property synthesizer 212). Each of the list elements 606a–m includes a synthesized net name field 608a and a synthesized net property value field. In each of the list elements 606a–m, the synthesized net name field 608a identifies a particular signal net N within the package models 202a–n, and the synthesized net property value field 608b indicates the synthesized property value produced by the net property synthesizer 212 for signal net N. The synthesized net property report 214 also includes a synthesized property units specifier 602 which specifies the units in which the synthesized net property values 608b are expressed. The synthesized property units specifier 602 specifies the same units as are specified by the synthesized property units selector 410 (FIG. 4A).

Although the embodiment of the synthesized net property report 214 illustrated in FIG. 6 includes only the single synthesized net property value field 608b, the synthesized net property report 214 may include any number of synthesized net property value fields. For example, the synthesized net property report 214 may include two synthesized net property value fields, one for storing synthesized signal net path lengths and the other for storing synthesized signal net propagation delays.

Figure 5A:
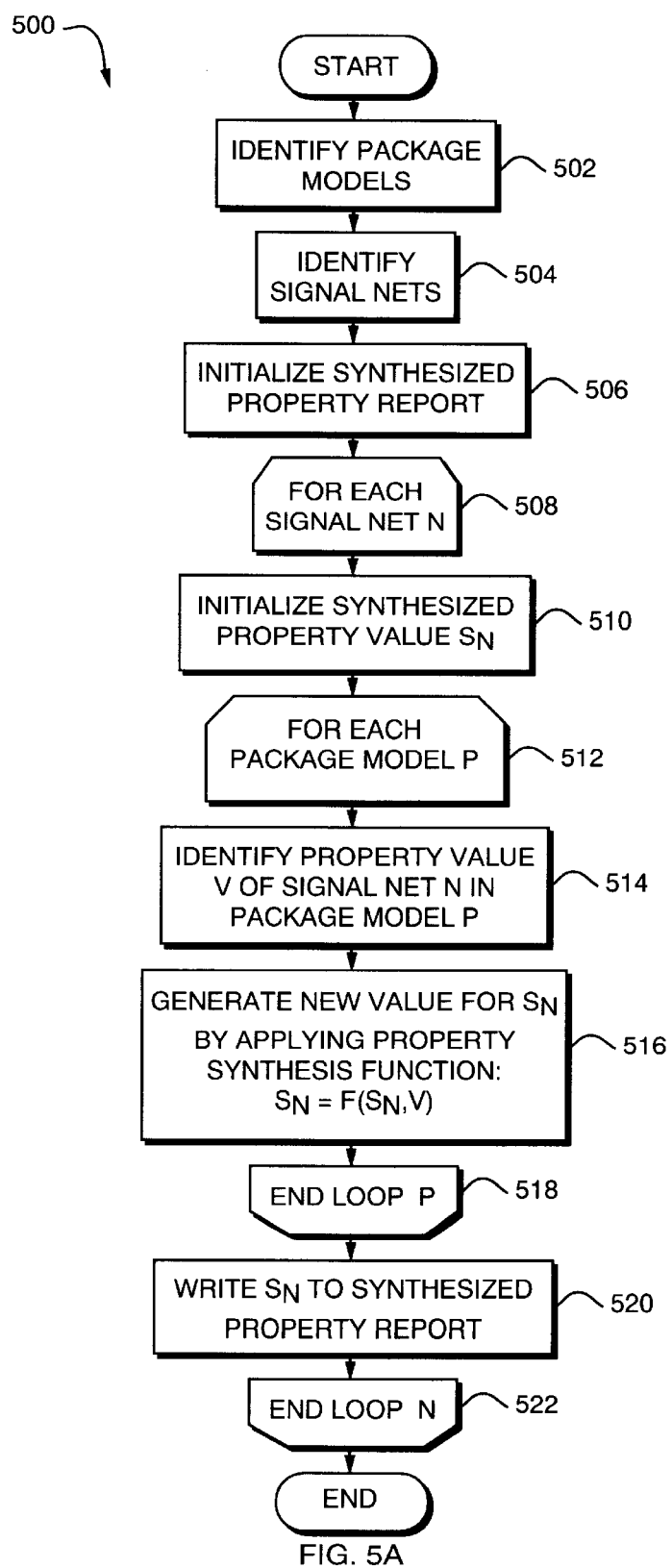
FIG. 5A is a flowchart of a method that is used by a net property synthesizer to synthesize package-specific net property reports into a synthesized net property report according to one embodiment of the present invention.

Referring to FIG. 5A, a flowchart of a method 500 is shown that is used by the net property synthesizer 212 (FIG. 2) to synthesize package-specific property values in the package-specific net property reports 208a–n into synthesized property values in the synthesized property report 214 according to one embodiment of the present invention. The net property synthesizer 212 identifies the package models from which signal net property values are to be synthesized (step 502). The net property synthesizer 212 may, for example, identify these package models by reading the package model list 406 (FIG. 4A). For purposes of example, assume that the package models identified in step 502 are the package models 202a–n illustrated in FIG. 2. The package models 202a–n may, for example, be a subset of all of the package models in a particular IC design.

The net property synthesizer 212 identifies the signal nets from which package-specific property values should be synthesized (step 504). The net property synthesizer 212 may, for example, identify these signal nets by reading the input signal net list 408 (FIG. 4A). The net property synthesizer 212 initializes the synthesized property report 214 (step 506). If, for example, the synthesized property report 214 is to be stored in a text file, the net property synthesizer 212 may initialize the synthesized property report 214 by creating and opening an empty text file.

The net property synthesizer 212 enters a loop over each signal net N in the list of identified signal nets (step 508). The net property synthesizer 212 synthesizes package-specific property values for the signal net N into a single synthesized property value as follows. The net property synthesizer 212 initializes a synthesized property value $S_N$ for the signal net N (step 510). If, for example, the property to be synthesized is signal net path length, the net property synthesizer 212 may initialize the value of $S_N$ to zero. In the present example, all of the package-specific net property reports 208a–n report on the same property, and therefore the "property to be synthesized" by the net property synthesizer 212 is defined by the property that is reported on by the package-specific net property reports 208a–n.

The net property synthesizer 212 enters a loop over each package model P in the identified list of package models (step 512). The net property synthesizer 212 identifies the package-specific property value V of signal net N in package model P (step 514). The net property synthesizer 212 may perform this step, for example, by searching through the signal net property list (such as list 304 or 312 in FIG. 3) of package model P for a list element having the same net name as signal net N, and identifying the property value associated with that list element as the property value V.

The net property synthesizer 212 updates the value of the synthesized property value $S_N$ by applying the property synthesis function 216 (FIG. 2) to the existing value of $S_N$ and the package-specific property value V (step 516). In other words, the net property synthesizer 212 updates the value of $S_N$ by applying the formula $S_N=F(S_N, V)$. The property synthesis function 216 may, for example, be an arithmetic function such as addition or multiplication. If, for example, the property to be synthesized is path length or propagation delay, the property synthesis function 216 may be addition.

The net property synthesizer 212 repeats steps 514 and 516 for each package model P (step 518). The effect of the loop represented by steps 512–518 is to synthesize all of the package-specific property values V for the signal net N into a single synthesized property value $S_N$ using the property synthesis function F. If, for example, the property synthesis function F is addition, the effect of the loop performed in steps 512–518 is to produce a synthesized property value $S_N$ for signal net N which is the sum of all of the package-specific property values for signal net N. Upon generation of the synthesized property value $S_N$, the net property synthesizer 212 writes the synthesized property value $S_N$ to the synthesized property report 214 (step 520). Step 520 includes writing the synthesized net name of signal net N to the synthesized property report 214 (FIG. 6).

The net property synthesizer 212 repeats steps 510–520 for each of the identified signal nets N (step 522). Upon completion of the method 500, the synthesized property report 214 includes synthesized property values 608b for all of the signal nets specified by the input signal net list 408.

Having described the general operation of the system 200 illustrated in FIG. 2, a particular embodiment will now be described in which the reports 208a–n include the package-specific path lengths of signal nets in the package models 202a–n, and in which the net property synthesizer 212 calculates the total (i.e., synthesized) propagation delays of the signal nets based on: (1) the package-specific path lengths of the signal nets, and (2) the dielectric constants and permeabilities of the layers of the packages.

Different packages are often composed of different materials. As a result, a signal in a particular signal net may travel more quickly through one package than another. To calculate the total propagation delay of such a signal net, it may be necessary to take into account the speed at which signals travel through different packages in the IC.

Figure 5B:
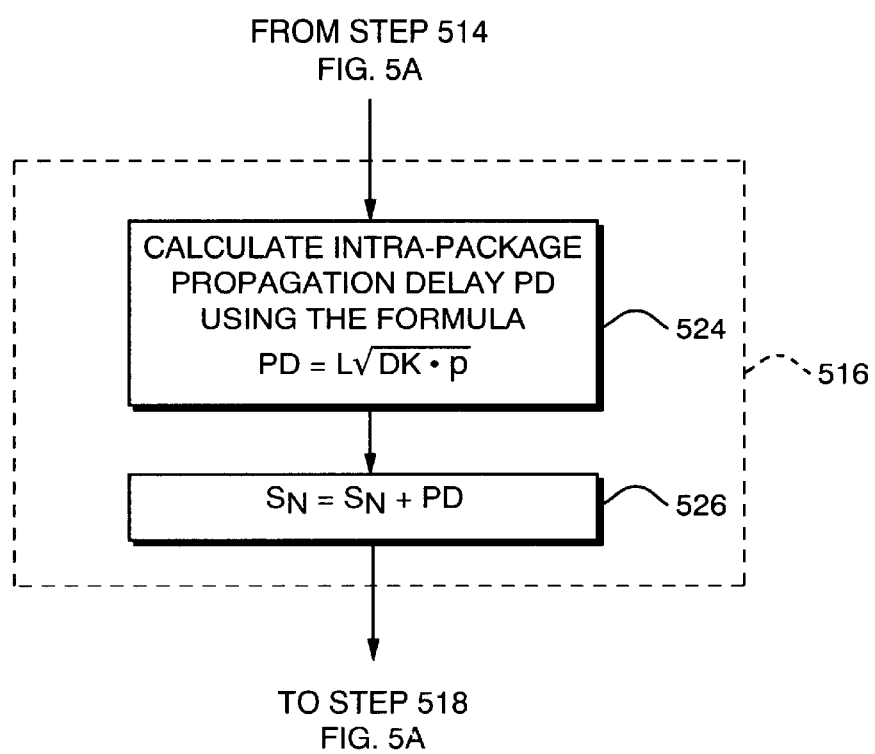
FIG. 5B is a flowchart of a method that is used by a net property synthesizer to calculate total propagation delays of signal nets through an integrated circuit according to one embodiment of the present invention.

For example, referring to FIG. 5B, in one embodiment of the net property synthesizer 212 calculates total propagation delays by implementing step 516 (application of the property synthesis function 216) as follows.

The net property synthesizer 212 calculates the intra-package propagation delay PD of the signal net N using Equation 1:

$$PD = L\sqrt{DK \cdot p} \qquad \text{Equation 1}$$

where L is the intra-package path length of signal net N, DK is the dielectric constant of the package substrate, and p is the permeability of the package substrate (step 524). The length L is the package-specific property value V obtained in step 514 of FIG. 5A.

The net property synthesizer 212 updates the value of the synthesized property value $S_N$, which in this case represents a propagation delay, by adding the value of PD to the current value of $S_N$ and assigning the result to $S_N$ (step 526). In summary, steps 524 and 526 update the value of $S_N$ by calculating the intra-package propagation delay of signal net N through package P and adding this intra-package propagation delay to the total propagation delay $S_N$.

As described above with respect to FIG. 3A, net property values may be expressed in different units of measurement in different ones of the package-specific net property reports 208a–n. In one embodiment, the net property synthesizer 212 converts package-specific net property values in the package-specific net property reports 208a–n into the units specified by the synthesized property units selector 410 (FIG. 4A) when generating the synthesized net property report 214.

Figure 5C:
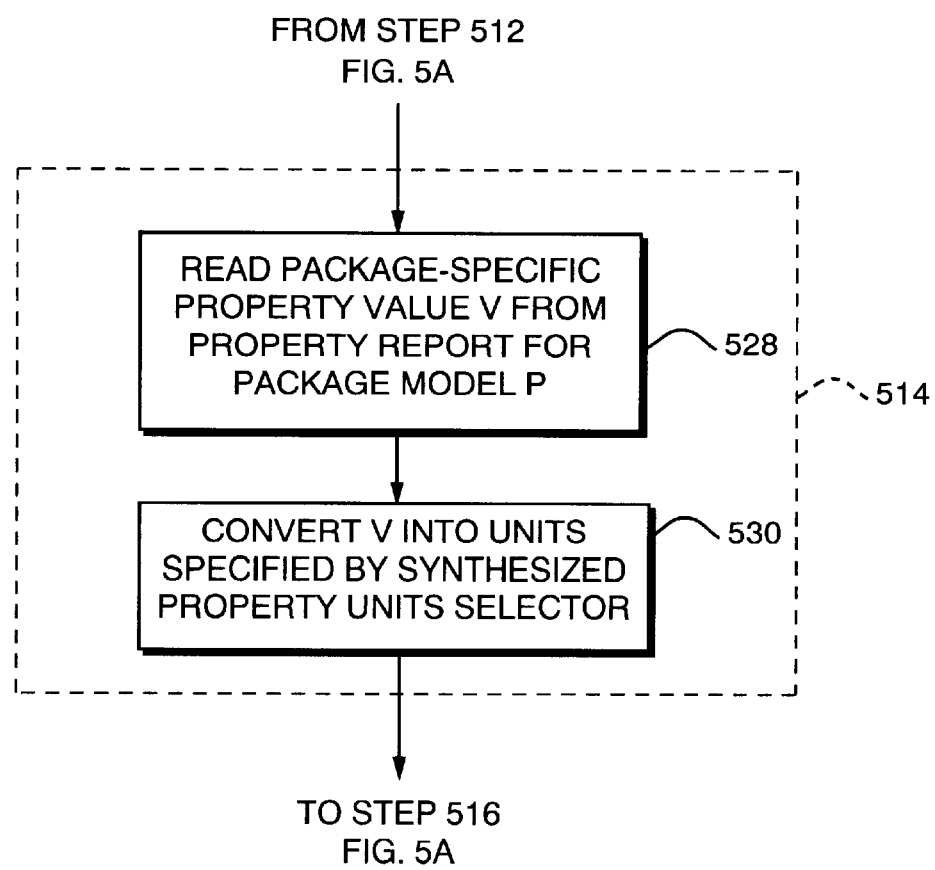
FIG. 5C is a flowchart of a method that is used by a net property synthesizer to convert a net property value from one unit of measurement into another according to one embodiment of the present invention.

Referring to FIG. 5C, for example, in one embodiment of the present invention, the net property synthesizer 212 performs this unit conversion by identifying the property value V of signal net N in package model P (step 514 of FIG. 5A) as follows. The net property synthesizer 212 reads the package-specific property value V from the package-specific net property report for package model P (step 528). The value of V that is read in step 528 is expressed in the units specified by the package-specific net property report's property units specifier (such as the property units specifier 302 in the case of the package-specific net property report illustrated in FIG. 3A). The net property synthesizer 212 converts the value of V into the units specified by the synthesized property units selector 410 (FIG. 4A). This converted value of V is then used by the net property synthesizer 212 in step 516 of the method 500 illustrated in FIG. 5A.

The net property synthesizer 212 may perform the units conversion in step 530 using techniques that are well-known to those of ordinary skill in the art. The net property synthesizer 212 may, for example, include conversion factors for converting among various net property units (such as millimeters, mils, and microns). The units conversion of step 530 may then be performed by multiplying the package-specific value of V obtained in step 528 by a conversion factor that is selected based on the package-specific property units of V and the synthesized property units to be obtained.

As mentioned above with respect to FIG. 4A, signal nets may have different names in different ones of the package models 202a–n. To identify the package-specific property value V of a particular signal net N in a package P (FIG. 5A, step 514), the net property synthesizer 212 must know which name is used to identify signal net N in package P. In one embodiment, signal net mapping 436 (FIG. 4A) provides two mappings to enable to the net property synthesizer 212 to perform this task: (1) a mapping between signal net names in the package models 202a–n that are used to identify the same signal net; and (2) a mapping between signal net names in the package models 202a–n and synthesized signal net names to be used in the synthesized property report 214.

Figure 4B:
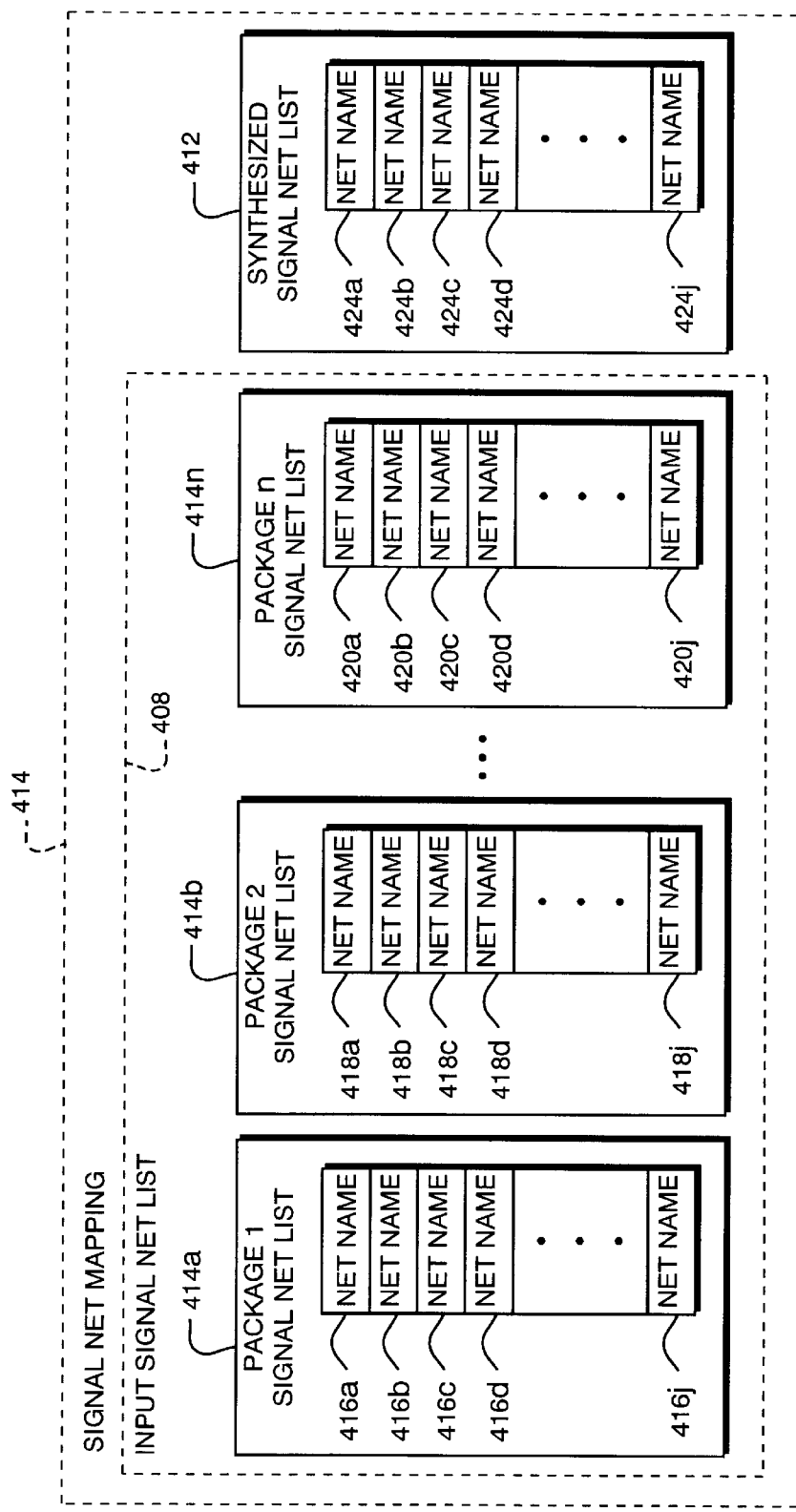
FIG. 4B is a block diagram of the logical structure of particular embodiments of package-specific signal net lists and a synthesized signal net list according to one embodiment of the present invention.

For example, referring to FIG. 4B, a particular embodiment of the signal net mapping 436 is illustrated. In the embodiment illustrated in FIG. 4B, the signal net mapping 436 is implemented using the input signal net list 408 and the synthesized signal net list 412. In the illustrated embodiment, the input signal net list 408 includes a plurality of signal net lists 414a–n, each of which corresponds to a particular one of the package models 202a–n. For example, signal net list 414a corresponds to package model 202a, signal net list 414b corresponds to package model 202b, and so on. Each of the signal net lists 414a–n includes a list of the names that the corresponding package model uses to identify the signal nets to be synthesized by the net property synthesizer 212.

Each of the signal net lists 414a–n includes j elements, where j is less than or equal to the number of signal nets in the package models 202a–n. In other words, the signal net lists 414a–n may identify all or any subset of the signal nets in the package models 202a–n.

The plurality of signal net lists 414a–n provides a mapping among signal net names in the package models 202a–n (and therefore also provides a mapping among signal net names in the package-specific net property reports 208a–n) which refer to the same signal net. For any number k (where k≦j), the kth element of each of the lists 414a–n refers to the same signal net. Consider, for example, the first net name in each of the signal net lists 414a–n. Signal net name 416a (in package-specific signal net list 414a), signal net name 418a (in package-specific signal net list 414b), and signal net name 420n (in package-specific signal net list 414n) refer to the same signal net N. More specifically, signal net name 416a is the name that package model 202a uses to refer to signal net N, signal net name 418a is the name that package model 202b uses to refer to signal net N, and so on. As described above, signal net N may have different names in different ones of the package models 202a–n. The package-specific signal net lists 414a–n therefore provide a mechanism for identifying which signal net names in different ones of the package models 202a–n refer to the same signal net.

Assume, for example, that the name for signal net N is "signal1" in package model 202a, "sig1" in package model 202b, and "data_signal1" in package model 202n. Such differences in the names of signal nets across package models are common, particularly when each of the package models 202a–n is designed by a different designer or team of designers. In this particular example, the net name 416a would contain the value "signal1", the net name 418a would contain the value "sig1", and the net name 420a would contain the value "data_signal1", thereby indicating that each of these names refers to the same signal net in corresponding ones of the package models 202a–n.

The synthesized signal net list 412 provides a list of signal net names 424a–j to use in the synthesized property report 214. The first name 424a in the synthesized signal net list 412 is the name to be used for the first signal net in the package-specific signal net lists 414a–n, the second name 424b is the name to be used for the second signal net in the package-specific signal net lists 414a–n, and so on. Assume for purposes of example that the first net name 424a in the synthesized signal net list 412 is "signal_1". In this case the synthesized net property value that is synthesized from the signal net having the names 416a ("signal1"), 418a ("sig1"), and 420a ("data_signal1") will be given the name "signal_1" in the synthesized property report 214.

For example, referring to FIG. 5D, in one embodiment of the present invention, the net property synthesizer 212 uses the signal net mapping 436 to identify the value V of signal net N in package model P (step 514 of FIG. 5A) as follows. The net property synthesizer 212 identifies the package-specific signal net list for package model P (step 532). The net property synthesizer 212 may readily perform this step in any of a variety of ways. For example, in one embodiment, in the method 500 illustrated in FIG. 5A the net property synthesizer 212 maintains a counter p through each iteration of the loop performed in steps 512–522. The value of p may, for example, be initialized to zero and be incremented at the end of each iteration of the loop. The counter p may therefore be used to identify corresponding ones of the package models 202a–n, the package-specific net property reports 208a–n, and the package-specific signal net lists 414a–n. For example, the value p=0 may identify the package model 202a, the package-specific net property report 208a, and the package-specific signal net list 414a. The net property synthesizer 212 may therefore identify the package-specific signal net list for package model P (step 532) as the pth one of the package-specific signal net lists 414a–n.

The net property synthesizer 212 identifies the name of signal net N in the package-specific signal net list identified in step 532 (step 534). The net property synthesizer 212 may perform this step by, for example, using a counter to count each iteration of the loop performed in steps 508–522 of FIG. 5A, and by using this counter as an index into the package-specific signal net list identified in step 532. If, for example, the identified package-specific signal net list is list 414a (FIG. 4B), a counter with a value of zero would identify signal net name 416a.

The net property synthesizer 212 uses the signal net name identified in step 534 to identify the package-specific property value V in the package-specific property report for package model P (step 536). The net property synthesizer 212 may, for example, identify the package-specific property report for package model P using the counter p described above. Assume for purposes of example that the identified package-specific property report is report 208a (FIG. 3A). The net property synthesizer 212 may perform step 536 by searching the net names 308a for the signal net name identified in step 534 and selecting the corresponding net property value 308b as the value for V. Upon completion of the process illustrated in FIG. 5D, the identified value of V may be used in step 516 of FIG. 5A.

Figure 5D:
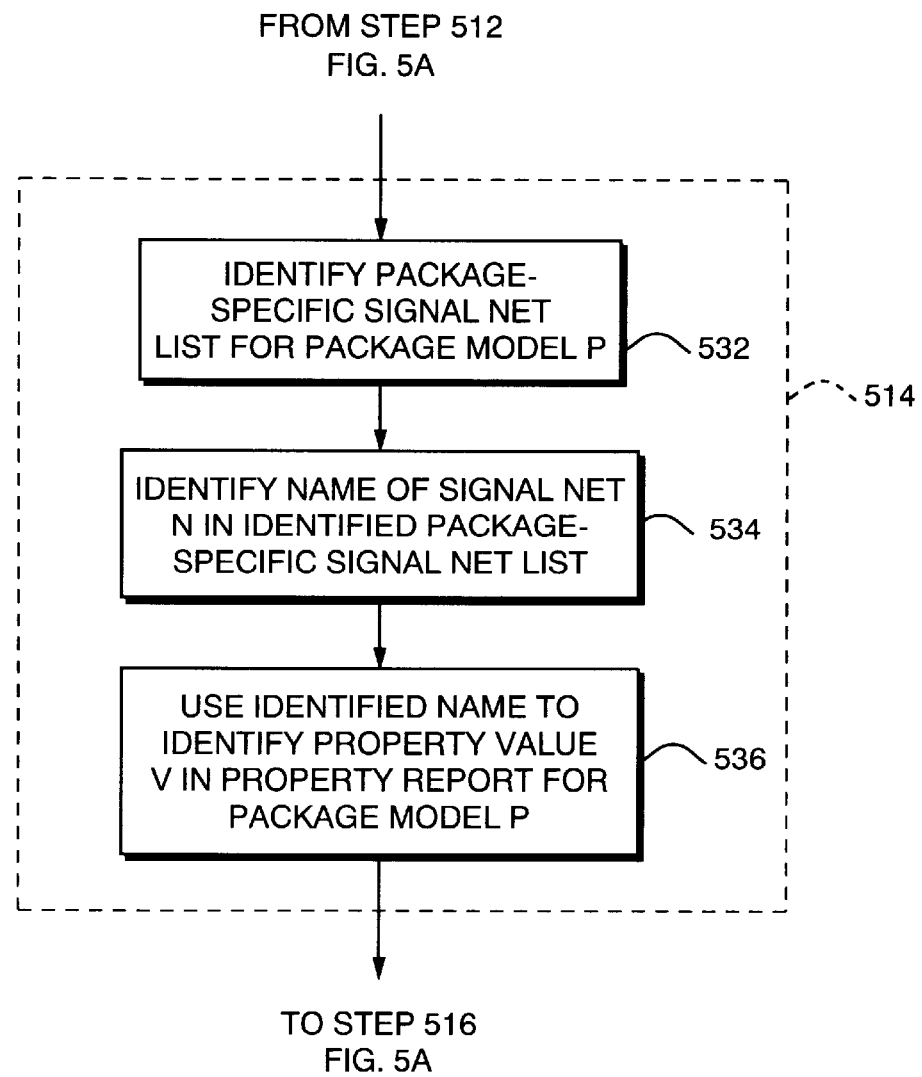
FIG. 5D is a flowchart of a method that is used by a net property synthesizer to map signal net names used in multiple package models according to one embodiment of the present invention.

It should be appreciated from the description above that the process illustrated in FIG. 5D enables the net property synthesizer 212 to synthesize property values from the package models 202a–n even when the package models 202a–n use different names to refer to the same signal nets.

An embodiment of the present invention will now be described in more detail in which the package-specific net property reports 208a–n include property values for each layer in the package models 202a–n. To clarify the explanation of this embodiment, various features of signal nets in multi-layer packages will first be described.

Figure 7:
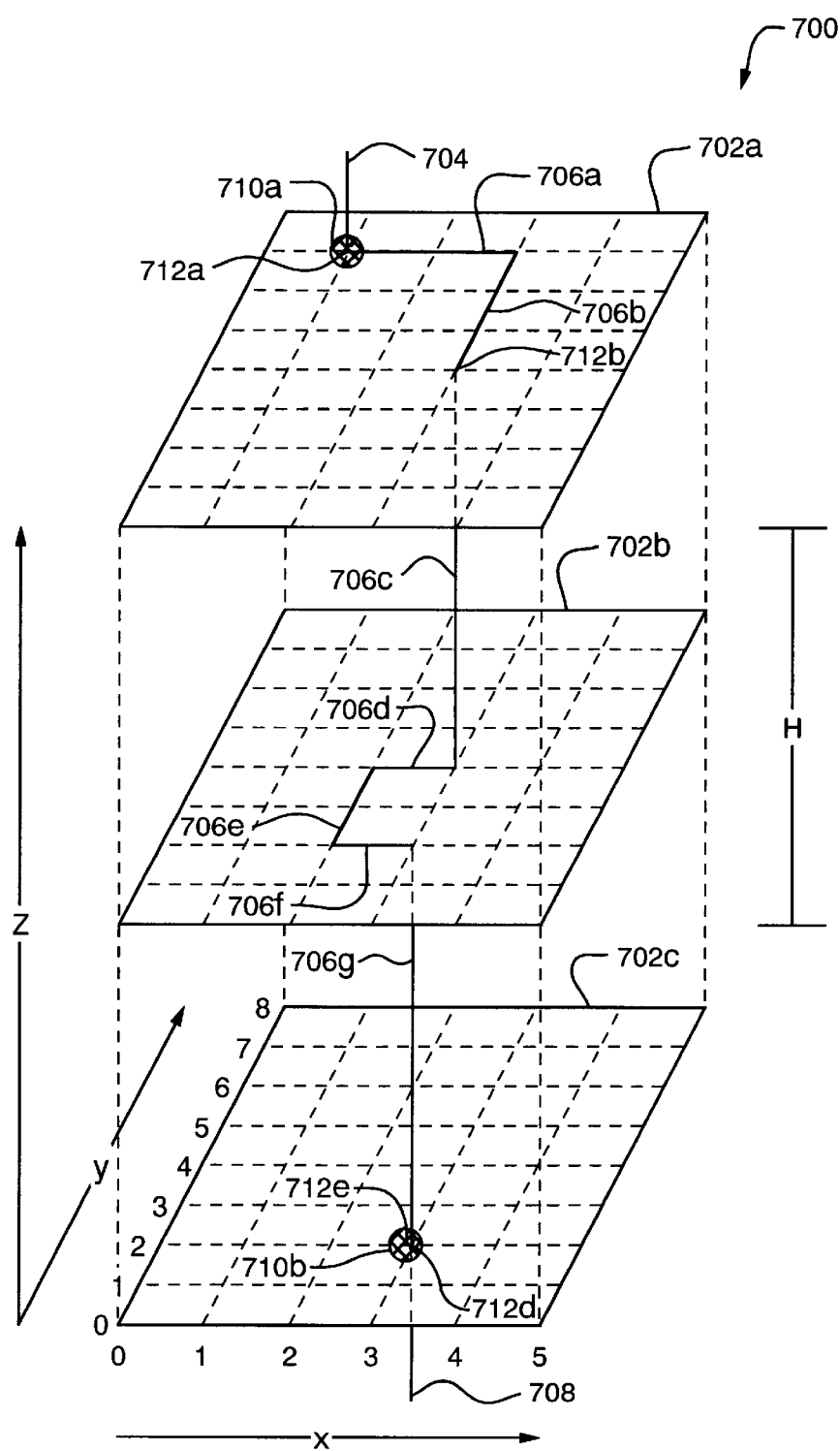
FIG. 7 is a perspective view of an integrated circuit package having multiple layers and a single signal net.

Referring to FIG. 7, an example package 700 having three layers 702a–c is illustrated. It should be appreciated that the layers 702a–c are not drawn to scale and that in general only relevant features of the layers 702a–c are shown for ease of illustration and explanation. The three dimensions of the package 700 are illustrated using x, y, and z axes. The values provided on the x and y axes in FIG. 7 do not correspond to particular units of measurement (such as millimeters or mils), but rather are generic units provided merely for ease of illustration and explanation.

For ease of reference, layer 702a will be referred to as the "top" layer of package 700, layer 702b as the "middle" layer of package 700, and layer 702c as the "bottom" layer of package 700. Although package 700 has three layers 702a–c, in practice packages may have any number of layers. The package 700 may be one of multiple packages in an IC (not shown).

A portion of a signal net is also shown in FIG. 7. The signal net is referred to herein by reference numeral 706 and includes segments 706a–g. Although only one signal net 706 is shown, a typical package may include thousands of signal nets. A segment 704 of the signal net 706 connects to the top layer 702a of the package 700 from a package (not shown) that is above the package 700 in the IC. Segment 704 connects to the package 700 at center 712a of a pad 710a on the top layer 702a of the package 700. The pad 710a may be one of many pads in a connection (not shown) on the top layer 702a. The signal net 706 includes segment 706a, which originates at the pad center 712a and which extends for two units on the x axis. The next segment 706b of the signal net 706 extends for three units on the y axis. The signal net 706 therefore has a path length of five units (two units for segment 706a and three units for segment 706b) within top layer 702a. Such a path length will be referred to herein as an "intra-layer path length" and alternatively as a "horizontal path length."

The signal net 706 next includes segment 706c, which extends downward from point 712b to the middle layer 702b of the package 700. The length of segment 706c is equal to the distance H between each layer of the package 700. Such a path length will be referred to herein as a "vertical path length." Signal nets traverse vertical path lengths through vias, which are vertical conductors or conductive paths forming the interconnection between one layer of an IC and another.

The signal net 706 next includes segments 706d, 706e, and 706f within the middle layer 702b. Signal net 706 next includes a segment 706g which extends downward to the bottom layer 702c, where it connects to pad 710b at point 712d. As will be described in more detail below, segment 706g does not connect to center 712e of pad 710b. A segment 708 of the signal net 706 extends from the bottom layer 702c of the package 700 to a package (not shown) below package 700.

The aggregate path length of segments 706a–g is an example of a "synthesized path length" or a "total path length" as those terms are used herein. The sum of the path lengths of segments 706a–g represents the total distance spanned by the signal net 706 within the package 700.

In one embodiment, the package-specific net property reports 208a–n include information about the intra-layer path lengths of segments of signals nets in the packages modeled by the package models 202a–n, respectively. The package-specific net property reports 208a–n may, for example, have the logical structure illustrated in detail in FIG. 3B. Although only the report 208a is illustrated in FIG. 3B, the other reports 208a–n may have the same logical structure.

Figure 3B:
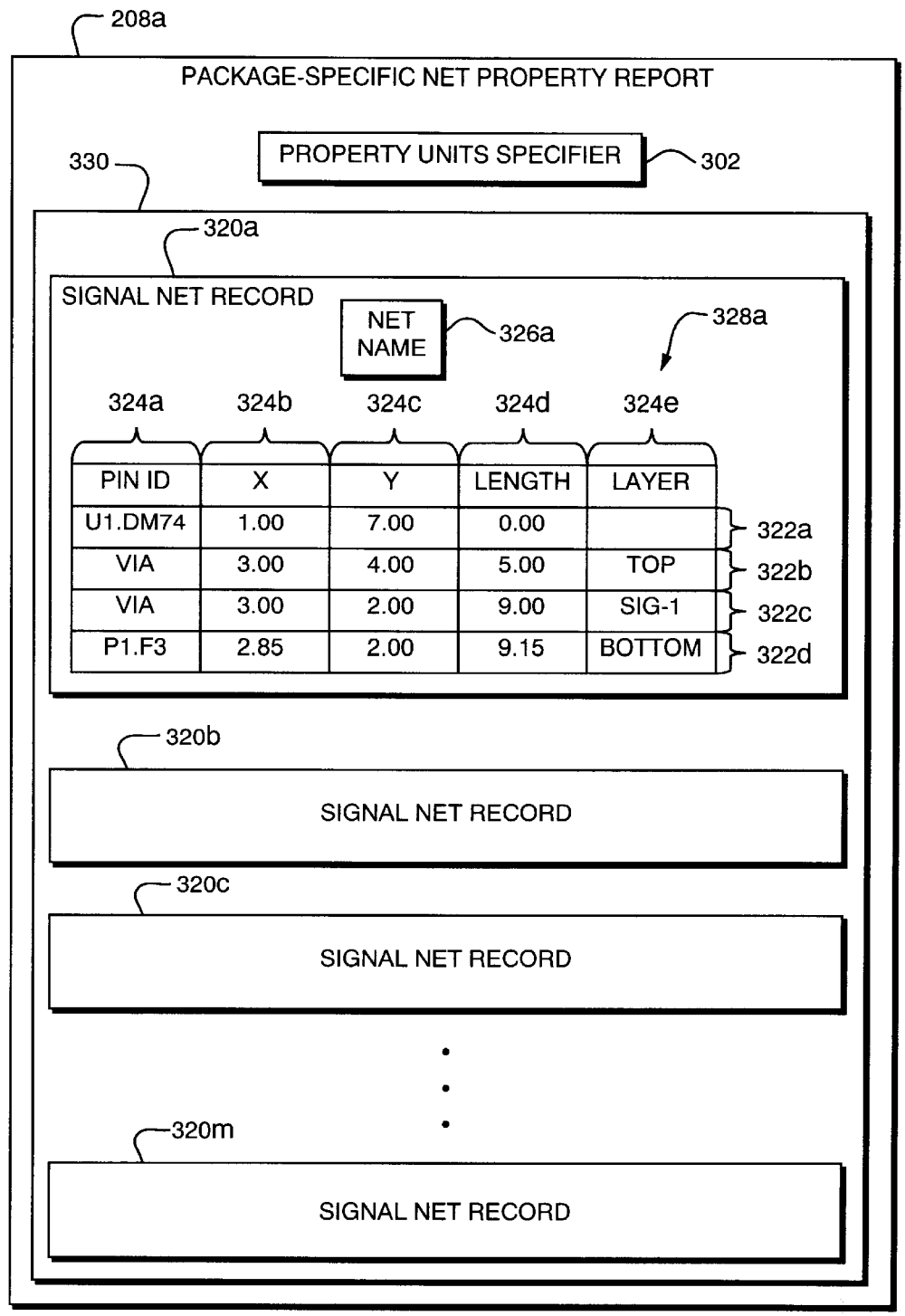
FIG. 3B is a block diagram of the logical structure of a detailed package-specific net property report generated by an integrated circuit package design tool.

Referring to FIG. 3B, the package-specific net property report 208a includes property units specifier 302, as described above with respect to FIG. 3A. In place of the net property value list 304 shown in FIG. 3A, the report 208a in FIG. 3B includes a signal net record list 330 having a plurality of signal net records 320a–m. Just as the net property value list 304 in FIG. 3A associates signal net names 308a with net property values 308b, the signal net record list 330 in FIG. 3B associates net names with more detailed information about the corresponding signal nets.

Consider, for example, signal net record 320a. The logical structure and example contents of record 320a are illustrated in detail in FIG. 3B. Although the remaining signal net records 320b–m have the same logical structure as record 320a, only record 320a is shown in detail in FIG. 3B for ease of illustration. Signal net record 320a includes a signal net name 326a which identifies the name of the corresponding signal net in the package model 202a.

The signal net record 320a also includes signal net layer information 328a which, in this example, provides information about the corresponding signal net in each layer of the package modeled by package model 202a. The signal net layer information 328a includes a plurality of rows 322a–d, each of which provides information about the corresponding signal net in a particular one of the package layers. In the example shown in FIG. 3B, the rows 322a–d are arranged in an order that corresponds to the order of the package layers, in which the first row 322a corresponds to pad 710a at the top layer 702a of the package 700, the second row 322b corresponds to the top layer 702a of the package 700, the third row 322c corresponds to the second layer 702b of the package 700, and the fourth row 322d corresponds to the bottom layer 702c of the package 700.

The signal net layer information 328a includes a Pin ID column 324a, an X column 324b, a Y column 324c, a Length column 324D, and a Layer column 324e. For each of the rows 322a–d:

(1) the Pin ID column 324a contains a pin identifier (pin ID) of the pin at which the signal net is connected in the corresponding layer of the package;

(2) the X and Y columns 324b and 324c contain the x and y coordinates, respectively, at which the signal net exits from the corresponding layer of the package;

(3) the Length column 324d contains the running aggregate horizontal path length of the signal net within the package; and (4) the Layer column 324e contains the name of the corresponding layer of the package.

Assume, for example, that the signal net record 320a corresponds to the package 700 illustrated in FIG. 7. Now consider the first row 322a of the signal net layer information 328a which, which provides information about signal net 706 in the top layer 702a of package 700. The value in the Pin ID column 324a of row 322a is "U1.DM74," indicating that the pin identifier of the pad 710a at which signal net 706 is connected to layer 702a in package 700 is U1.DM74. According to the naming convention used in this particular embodiment, the prefix U1 has a special meaning, which refers to a connection on package 700 for connecting package 700 to a die. As a result, the Layer column 324e is empty for row 322a. The connection U1 may have many thousands of pads, each of which may be used to connect a distinct signal net. The suffix DM74 therefore specifies the particular pad 710a on connection U1 through which signal net 706 is connected to package 700. The X and Y columns 324b and 324c for row 322a indicate that signal net 706 is connected to pad U1.DM74 at coordinates (1.00, 7.00). The Length column 324d specifies a length of 0.00 for row 322a because signal net 706 has not yet traversed any horizontal distance across any layer of package 700.

Consider next the second row 322b, which provides information about signal net 706 in layer 702a of the package 700. The value in the Pin ID column 324a of row 322b is "VIA," indicating that signal net 706 exits from layer 702a of package 700 through a via (not shown). The remaining values in row 322b indicate that signal net 706 is connected to the via at coordinates (3.00, 4.00), that the name of layer 702a is "TOP" (indicating that it is the top layer of package 700), and that the running aggregate horizontal path length of signal net 706 through package 700 is 5.00 units (because the combined horizontal path length of segments 706a and 706b in layer 702a is 5.00 units).

Consider next the third row 322c, which provides information about signal net 706 in layer 702b of package 700. The value in the Pin ID column 324a of row 322c is "VIA," indicating that signal net 706 exits from layer 702b of package 700 through a via (not shown). The remaining values in row 322c indicate that signal net 706 is connected to the via at coordinates (3.00, 4.00), that the name of layer 702b is "SIG-1", and that the running aggregate horizontal path length of signal net 706 through package 700 is 9.00 (5.00 units in layer 702a plus 4.0 units in layer 702b).

Now consider the last row 322d of signal net layer information 328a, which provides information about signal net 706 in the final (bottom) layer 702c of package 700. The value in the Pin ID column 324a of row 322d is "P1.F3". According to the naming convention used in this embodiment, the prefix P1 refers to a connection (not shown) from package 700 to a motherboard. The suffix F3 refers to pad 710b on connection P1. The pin ID P1.F3 therefore refers to the specific pad 710b on layer 702c through which signal net 706 is connected. The values in the X and Y columns 324b and 324c indicate that signal net 706 is connected to pad P1.F3 at coordinates (2.85, 2.00), that the name of layer 702c is "BOTTOM," and that the running aggregate horizontal length of signal net N through package 700 at layer 702c is 9.15 units.

Since layer 702c is the bottom layer in the package 700, the aggregate horizontal path length of signal net 706 through package 700 is 9.15 units. This aggregate horizontal path length does not, however, take into account the vertical distance(s) spanned by the signal net 706. For example, referring again to FIG. 7, signal net 706 includes vertical segments 706c and 706g, each of which spans the horizontal distance H. The aggregate horizontal length 9.15 does not take into account these vertical distances and therefore does not represent the full aggregate path length of signal net 706 through the package 700.

Furthermore, signal nets do not always connect to the center of a pad. For example, as shown in FIG. 7, signal net segment 706g does not connect to the center of pad 710b. The aggregate horizontal distance (9.15) indicated in the package-specific net property report 208a, however, is based on the assumption that the signal net 706 connects to the center of pad 710b. The aggregate horizontal distances indicated in the package-specific net property reports produced by package design tools such as APD may therefore not be entirely accurate.

For both of the reasons just described, package-specific net property reports produced by conventional package design tools such as APD may not accurately represent the package-specific path length of signals nets within a package.

Figure 5E:
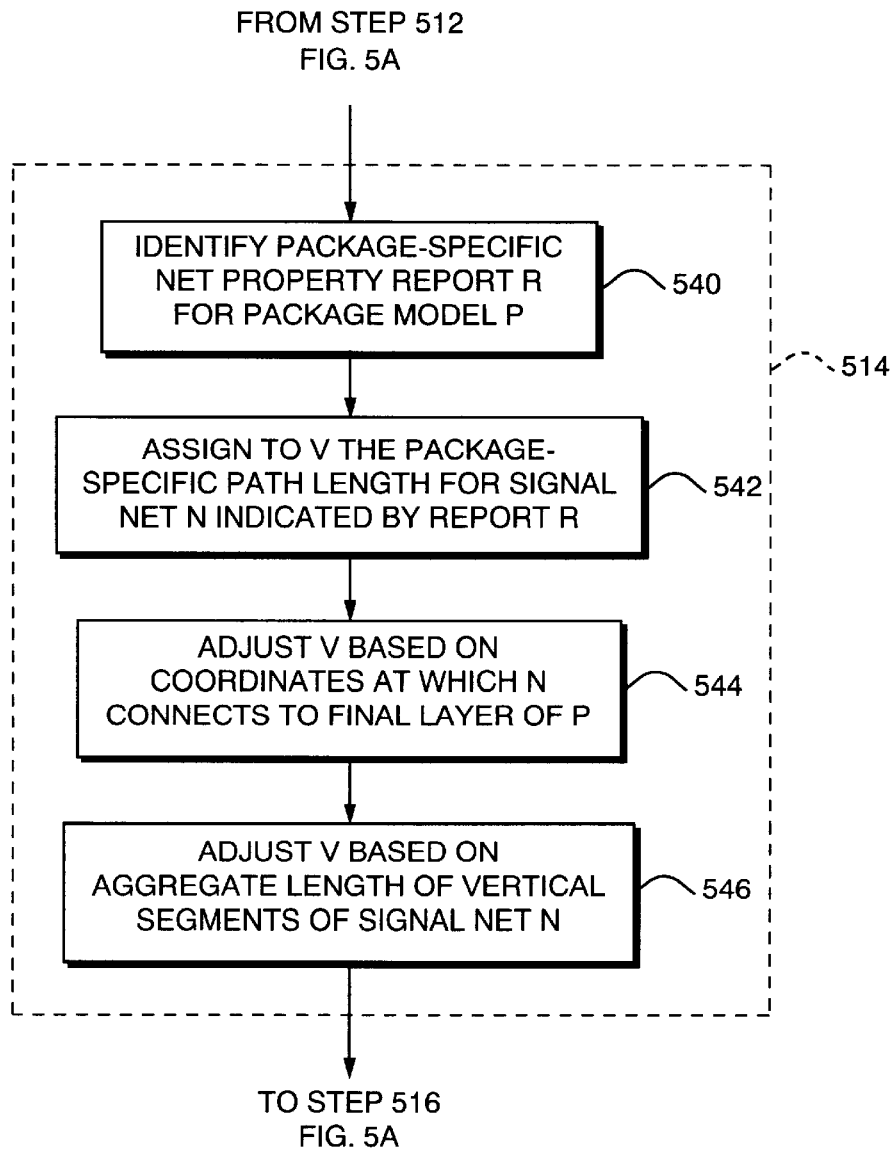
FIG. 5E is a flowchart of a method that is used by a net property synthesizer to adjust a synthesized net property value according to one embodiment of the present invention.

Referring to FIG. 5E, a flow chart of a process is shown that is used by the net property synthesizer 212 to calculate the package-specific path length $S_N$ of signal net N in package model P in one embodiment of the present invention. The calculation performed by the process illustrated in FIG. 5E takes into account both: (1) the horizontal and vertical distances spanned by the signal net N within package model P, and (2) the location(s) at which the signal net N connects to pads on the package modeled by package model P. The process illustrated in FIG. 5E may therefore calculate package-specific path lengths more accurately than conventional package design tools.

The process shown in FIG. 5E implements step 514 of FIG. 5A, which identifies the property value V of signal net N in package model P. As shown in FIG. 5E, the net property synthesizer 212 identifies the package-specific net property report R that corresponds to package model P using any of the techniques described above (step 540). For example, in the case of package model 202a, the corresponding package-specific net property report R is report 208a. The net property synthesizer 212 assigns to V the package-specific path length for signal net N indicated by report R (step 542). For example, in one embodiment the package-specific path length indicated by report 208a is 9.15 (FIG. 3B).

The net property synthesizer 212 adjusts the value of V based on the coordinates at which signal net N connects to the final layer of package P (step 544). The "final layer" of package P refers to the layer from which signal net N exits package P, which may, for example, be either the top or bottom layer of package P, depending on the package design.

In one embodiment, the net property synthesizer 212 adjusts the value of V (step 544) as follows. Let $L_B$ be the path length for signal net N that is indicated by the last element in the signal net layer information in report R. For example, in the case of package-specific net property report 208a, $L_B$ is the path length indicated by element 322d, namely 9.15 (FIG. 3B). Let $L_{B-1}$ be the path length for signal net N that is indicated by the next-to-last element in the signal net layer information in report R. For example, in the case of package-specific net property report 208a, $L_{B-1}$ is the path length indicated by element 322, namely 9.00 (FIG. 3B). Let M be a scaling factor expressed as a decimal, where $0 < M \leq 1$. The net property synthesizer 212 may adjust the value of V in step 544 using Equation 2:

$$V = V - M(L_B - L_{B-1}) \qquad \text{Equation 2}$$

In other words, the net property synthesizer 212 subtracts $L_{B-1}$ from $L_B$. The resulting difference represents the distance from the coordinates at which signal net N connects to the final (e.g., bottom) layer of package P and the center of the pad on the final layer of package P. The net property synthesizer 212 multiplies this difference by the scaling factor M, and then subtracts the scaled difference from the reported package-specific path length to obtain an adjusted package-specific path length which is assigned to V.

The net property synthesizer 212 adjusts the value of V based on the aggregate length of the vertical segments of signal net N within package P (step 546). The net property synthesizer 212 may, for example, perform this adjustment by adding the aggregate length of the vertical signal net segments to the value of V. If the distance between package layers is H, and the number of package layers is L, then the net property synthesizer may perform step 546 using Equation 3:

$$V=V+H(L-1) \qquad \text{Equation 3}$$

For example, if the number of package layers L is three, then there are two (L−1) vertical gaps between layers, so the height H of each vertical gap is multiplied by two (L−1), and the product is added to V to produce a synthesized path length which reflects the vertical distances spanned by signal net N.

Equation 3 is based on the assumption, which may be valid in certain package designs, that signal nets only travel in a single direction (such as downward) through package layers. For example, the signal net 706 illustrated in FIG. 7 only travels downward through the package layers 702a–c. This is not, however, a limitation of the present invention and Equation 3 is provided merely for purposes of example. If, in a particular design, signal nets travel both upwards and downwards through package layers, it may be necessary to adjust the value of V using a technique other than Equation 3, as will be apparent to those of ordinary skill in the art.

After the value of V is adjusted in step 546 of FIG. 7, the adjusted value of V may be used in step 516 of FIG. 5A, as described above.

Figure 4C:
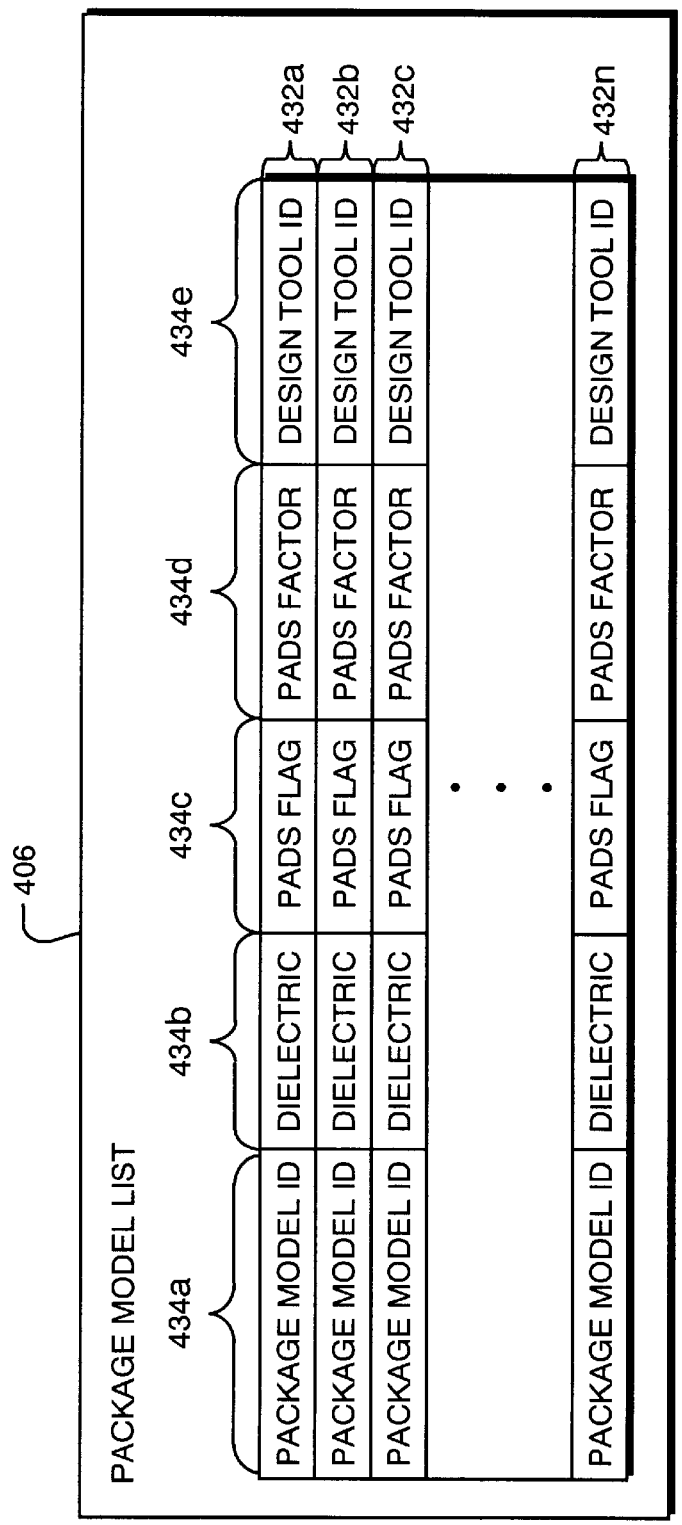
FIG. 4C is a block diagram of the logical structure of a package model list according to one embodiment of the present invention.

Referring to FIG. 4C, in one embodiment of the present invention, the package model list 406 has the following logical structure. The package model list 406 includes a plurality of list elements 432a–n, each of which corresponds to a particular one of the package models 202a–n. The package model list 406 includes a Package Model ID column 434a, a Dielectric column 434b, a Pads Flag column 434c, a Pads Factor column 434d, and a Design Tool ID column 434e. For each of the list elements 432a–n:

(1) the Package Model ID column 434a contains a package model identifier (such as a database filename) of the corresponding package model;
(2) the Dielectric column 434b contains the dielectric constant of the corresponding package;
(3) the Pads Flag column 434c contains a binary value which indicates whether the net property synthesizer 212 should perform the synthesized property value adjustment described above with respect to step 544 of FIG. 5E for the corresponding package model;
(4) the Pads Factor column 434d provides (if applicable) a multiplication factor M (Equation 2) to be used when performing the property value adjustment described above with respect to step 544 of FIG. 5E for the corresponding package model; and
(5) the Design Tool ID column 434e identifies the package design tool (such as APD) that produced the corresponding package model.

The net property synthesizer 212 may be capable of synthesizing net property values from package models produced by a plurality of package design tools. For example, the package models 202a–n may include package models produced by more than one package design tool. Different package design tools may produce package-specific net property reports having different file formats and containing different information. The net property synthesizer 212 may be capable of reading information from package-specific net property reports produced by a plurality of package design tools, and may use the design tool ID 434e to determine how to read and/or interpret net property values in a particular package-specific net property report. The net property synthesizer 212 may, for example, use the design tool ID 434e during the performance of step 514 (FIG. 5A). Those of ordinary skill in the art will appreciate how to process information from package-specific net property reports of varying formats based on the description provided herein.

Techniques described herein may be further employed to determine whether one or more of the synthesized net property values in the synthesized net property report 214 are equal within a predetermined tolerance. In particular, the net property synthesizer 212 may determine whether any of the synthesized net property values 608b in the synthesized net property report 214 deviates from a reference net property value by more than a predetermined maximum deviation. The net property synthesizer 212 may alert the user (e.g., the designer of one or more of the package models 202a–n) if such a deviation exists. This feature may be useful, for example, for determining whether the synthesized propagation delays of signal nets in the package models 202a–n are equal within the predetermined tolerance. If the synthesized propagation delays of the signal nets are not equal within the predetermined tolerance, the net property synthesizer 212 may alert the user to this fact. The user may take action in response to this alert, such as modifying the design of one or more of the package models 202a–n to make the synthesized propagation delays of the signal nets match more closely.

In a particular package design, signal nets are typically logically divided into groups. It is typically necessary for all signal nets within a particular signal net group to have the same synthesized propagation delay within a predetermined tolerance, although propagation delays may vary from signal net group to signal net group. In one embodiment of the present invention, the signal nets specified by the net property synthesis information 210 are logically divided into signal net groups, and the net property synthesizer 212 determines, for each signal net group, whether the synthesized propagation delays of signal nets in the signal net group are equal within the predetermined tolerance.

Figure 4D:
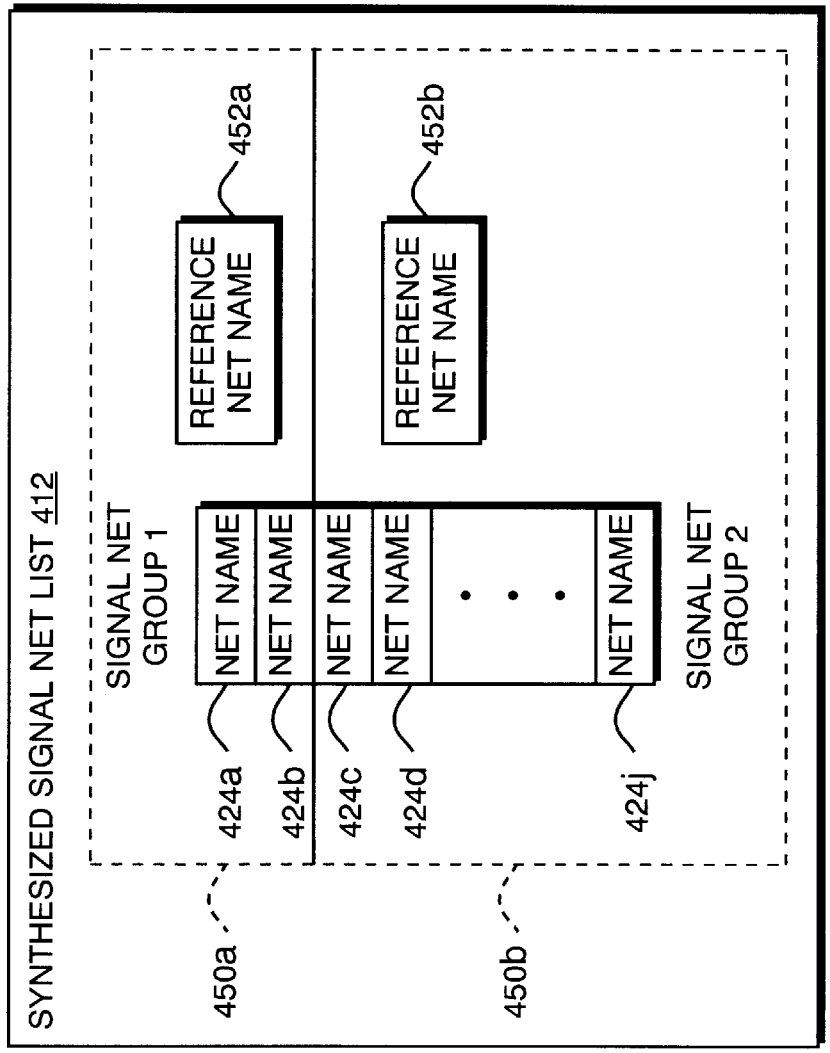
FIG. 4D is a block diagram of the logical structure of a synthesized signal net list according to one embodiment of the present invention.

Referring to FIG. 4D, in one embodiment the synthesized signal net list 412 has a logical structure that differs somewhat from that shown in FIG. 4B. As shown in FIG. 4D, the synthesized signal net list 412 includes the same list of signal net names 424a–j as that shown in FIG. 4B, but the list shown in FIG. 4D is divided into two signal net groups 450a and 450b. Although two signal net groups 450a–b are shown in FIG. 4D, there may be any number of signal net groups.

In one embodiment, each of the signal net groups 450a–b also includes a reference net name. For example, signal net group 450a includes reference net name 452a and signal net group 450b includes reference net name 452b. The reference net name for a signal net group specifies the name of the signal net whose synthesized property value is to be used by the net property synthesizer 212 as a reference point against which to compare the synthesized property values of all of the signal nets in the signal net group. A reference net name may, for example, specify the net name of a strobe signal whose synthesized propagation delay is to be used as a point of reference for all signal nets in a particular signal net group.

Figure 8A:
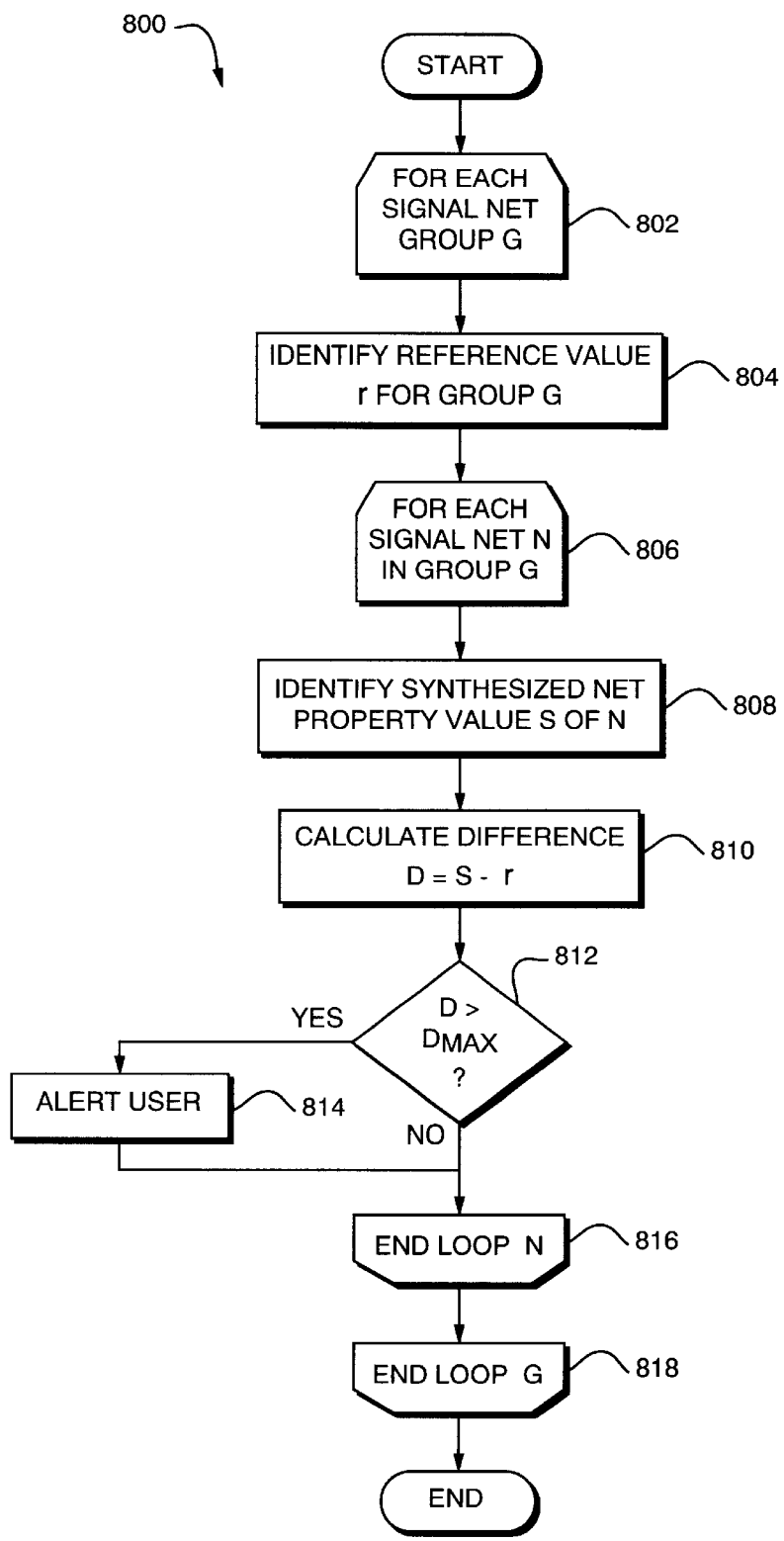
FIG. 8A is a flowchart of a method a flowchart which is used by a net property synthesizer to determine whether a synthesized net property value deviates from a reference net property value by more than a predetermined maximum deviation according to one embodiment of the present invention.

Referring to FIG. 8A, a flowchart of a method 800 is shown which is used by the net property synthesizer 212 to determine whether any of the synthesized net property values 608b in the synthesized net property report 214 deviates from a reference net property value by more than a predetermined maximum deviation. The method 800 may, for example, be performed after the completion of the method 500 illustrated in FIG. 5A, so that the synthesized net property report 214 may be assumed to exist at the beginning of the method 800.

Referring to FIG. 8A, the net property synthesizer 212 enters a loop over each signal net group G in the synthesized net property report 214 (step 802). Although in FIG. 6 the synthesized net property value list 604 is illustrated as a flat list, the synthesized net property value list 604 may alternatively be logically subdivided into groups of net property values corresponding to the signal net groups specified in the synthesized signal net list 412 (FIG. 4D).

The net property synthesizer 212 identifies a reference value r for group G (step 804). The net property synthesizer 212 may perform this step by, for example, identifying the reference net name (in the synthesized signal net list 412) for group G and using the reference net name as an index into the synthesized net property value list 604 (FIG. 6) to obtain the synthesized net property value of the signal net named by the reference net name. In other words, the reference value r is the synthesized net property value of the signal net named by group G's reference net name.

The net property synthesizer 212 enters a loop over each signal net N in the signal net group G (step 806). The net property synthesizer 212 identifies the synthesized net property value $S_N$ of N from the synthesized net property report 214 (step 808), and calculates the difference D between the synthesized net property value $S_N$ and the reference value r (step 810).

In one embodiment, property synthesis information 210 includes a maximum property value deviation $D_{max}$ 438. If the difference D is greater than $D_{max}$ (step 812), the net property synthesizer 212 alerts the user to this fact (step 814). In one embodiment, the net property synthesizer 212 performs step 814 as follows. Referring again to FIG. 6, in one embodiment, the synthesized net property value list 604 includes a binary alert flag field 608c. If the alert flag field 608c of a particular one of the list elements 606a–m is set, then the synthesized net property value of the corresponding signal net differs from the appropriate reference value by more than the maximum property value deviation $D_{max}$ 438. The net property synthesizer 212 may therefore perform step 814 of FIG. 8A by setting the alert flag field 608c of the list element corresponding to signal net N. If the synthesized property value of signal net N does not differ from the reference value r by more than the maximum property value deviation $D_{max}$ 438, the net property synthesizer 212 may either clear the appropriate alert flag field 608c or do nothing if the appropriate alert flag field is already cleared.

The net property synthesizer 212 repeats steps 808–814 for each signal net N in signal net group G (step 816) and repeats steps 804–816 for each signal net group G in the synthesized net property report 214 (step 818). Upon completion of the method 800, the user has been notified of any signal nets whose synthesized net property values deviate from the appropriate reference values by more than the maximum property value deviation $D_{max}$ 438. If, for example, the net property synthesizer 212 alerts the user (step 814) by setting alert flags in the synthesized net property report 214, the user may inspect the synthesized net property report 214 upon completion of the method 800 to determine which signal nets, if any, require design modification to bring their synthesized property values into conformance with the synthesized property values of other signal nets in the same signal net group.

Figure 8B:
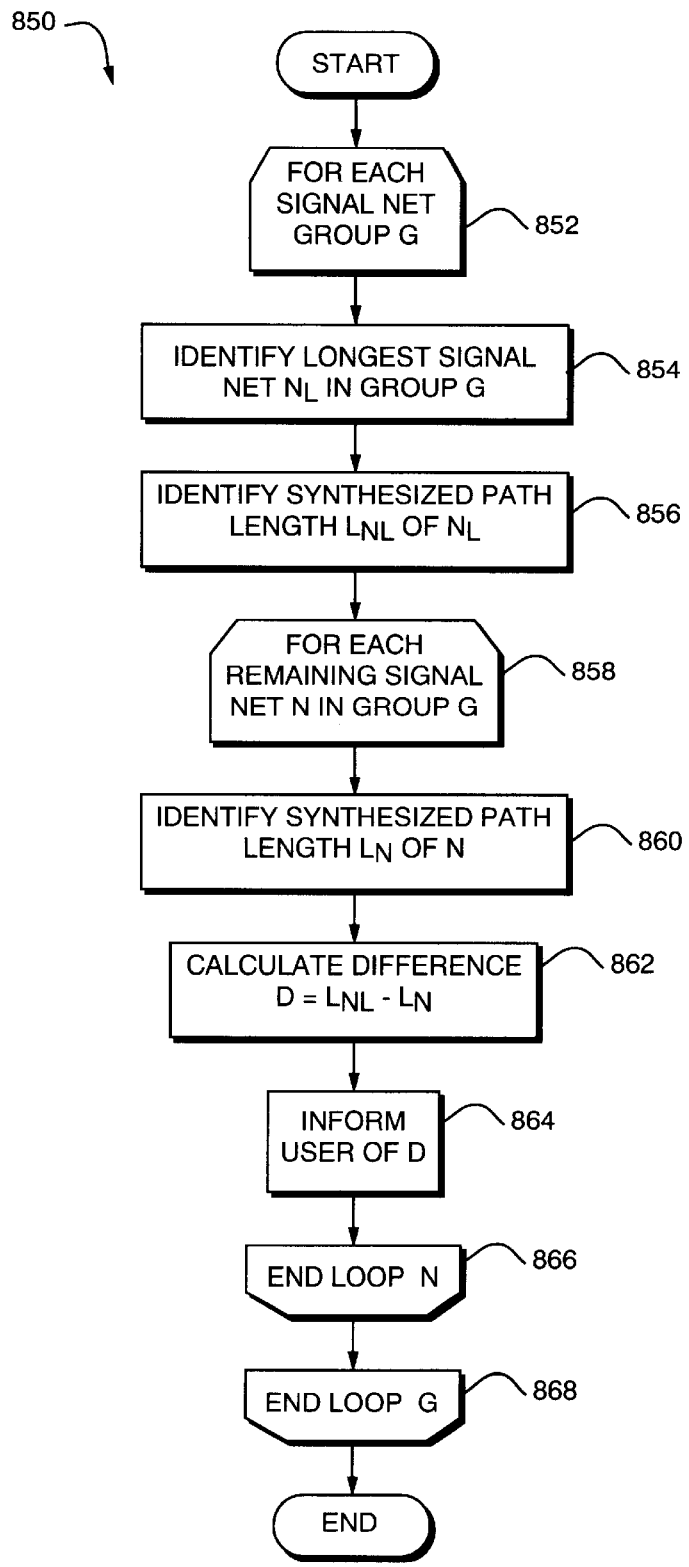
FIG. 8B is a flowchart of a method for assisting a user with the task of skew equalization in an integrated circuit package design according to one embodiment of the present invention.

It may be possible to equalize the propagation delays of signal nets in a signal net group by equalizing the aggregate (synthesized) path lengths of the signal nets in the signal net group. One way to perform such length equalization is by identifying the longest signal net in the signal net group and increasing the path lengths of the remaining signal nets in the signal net group so that they have the same length as the longest signal net. Referring to FIG. 8B, in one embodiment the net property synthesizer 212 assists the user in this task using a method 850. The method 850 may, for example, be performed after or as an integral part of the method 800 illustrated in FIG. 8A.

Referring to FIG. 8B, the net property synthesizer 212 enters a loop over each signal net group G in the synthesized net property report 214 (step 852). The net property synthesizer 212 identifies the longest signal net $N_L$ in group G (step 854), and identifies the synthesized path length $L_{NL}$ of signal net $N_L$ (step 856). The net property synthesizer 212 enters a loop over each remaining signal net N in the signal net group G (step 858). The net property synthesizer 212 identifies the synthesized path length $L_N$ of signal net N (step 860).

The net property synthesizer 212 calculates the difference D between the longest length $L_{NL}$ and the length $L_N$ (step 862). The difference D represents the amount by which signal net N's synthesized path length $L_N$ would need to be increased to equal the synthesized path length $L_N$ of signal net $N_L$. The net property synthesizer 212 informs the user of the difference D (step 864), such as by writing the value of D to the synthesized net property report 214 in a length difference field 608d (FIG. 6) of the list element corresponding to signal net N. The net property synthesizer 212 repeats steps 860–864 for each signal net N in signal net group G (step 866) and repeats steps 854–866 for each signal net group G in the synthesized net property report 214 (step 868).

Upon completion of the method 850, the user has been informed of the distances, if any, by which the synthesized path lengths of signal nets need to be increased in order to equalize the synthesized path lengths. If, for example, the net property synthesizer 212 performs step 864 by writing to the length difference field 608d in the synthesized net property report 214, the user may inspect the synthesized net property report 214 upon completion of the method 850 to determine the distance(s) by which signal nets need to be increased in order to equalize synthesized path lengths in the signal net groups. The information generated by method 850 may also be provided to an automatic routing tool, which may automatically re-route signal nets in the package models 202a–n so that the synthesized lengths of signal nets in each signal net group are equal. The use of such an automatic routing tool would eliminate the need for the user to perform such re-routing manually.

Among the advantages of the invention are one or more of the following.

Conventional package design tools maintain a distinct package model for each package in the design. As a result, no single source of information synthesizes information about all packages in the design. For example, no one of the package models 102a–n contains information about the total length of a signal net through all of the packages modeled by the package models 102a–n. As a result, it is typically necessary for package designers to calculate total path lengths and other synthesized property values manually, which is a tedious, time-consuming, and error-prone task. Calculating synthesized propagation delays and determining whether the propagation delays of all signal nets in a particular signal group are sufficiently similar is particularly difficult to perform manually due to the large number of operations that must be performed to make such a determination.

Various embodiments of the present invention address these problems by synthesizing property values from multiple package models automatically. Such automated synthesis may be faster and more reliable than manual synthesis. In particular, the automated synthesis performed by the net property synthesizer 212 may take into account factors such as vertical path length, varying units of measurement, and varying package dielectrics to automate aspects of the synthesis process which are typically performed manually. Furthermore, the synthesized net property report 214 may provide synthesized property values in a document that is formatted and organized in a manner that is easy to read and analyze. For example, as described above, the net property synthesizer 212 may divide signal nets into groups and organize the information in the synthesized net property report 214 based on the groups.

Another advantage of various embodiments of the present invention is the ability to automatically synthesize property values even when the package models 202a–n use mutually inconsistent signal net naming schemes. As described above with respect to FIG. 4B, the signal net mapping 436 may be used to automatically map inconsistent signal names to each other so that property values may be synthesized automatically across packages. Performing such an operation manually is particularly tedious and prone to error. The use of the signal net mapping 436 does not require the signal names in existing package models to be changed, and allows package designers to continue to engage in the common practice of using different signal names in different ones of the package models 202a–n. Rather, inconsistent signal names need only be reconciled in the signal net mapping 436, the creation of which will typically require less effort than the modification of signal names in the package models 202a–n.

Another advantage of various embodiments of the present invention is the ability to synthesize signal net property values across multiple package models, even if the package models have different formats, as in the case when the package models are produced by different package design tools from different vendors. The net property synthesizer 212 may perform such synthesis so long as the net property synthesizer 212 can read net property information from the package-specific net property reports 208a–n (FIG. 2) and process such information as described herein. Furthermore, because the net property synthesizer 212 synthesizes information provided in the package-specific net property reports 208a–n, the net property synthesizer 212 need not be capable of directly accessing the package models 202a–n, which may be represented in proprietary data formats. In contrast, the package-specific net property reports 208a–n produced by conventional package design tools are typically represented in ASCII text files, from which information may be readily extracted and processed using the techniques described herein.

Yet another advantage of various embodiments of the present invention is the ability to automatically determine whether synthesized property values (e.g., propagation delays) of signal nets deviate from a reference value by more than a predetermined maximum deviation. Such a determination is required, for example, to perform path length equalization. Making such a determination manually can be tedious, time-consuming, and error-prone, since it typically involves calculating the synthesized property values manually and, manually comparing each of the synthesized property values to the predetermined reference value, and manually determining whether any of the synthesized property values deviates from the predetermined reference value by more than the predetermined maximum deviation. In contrast, as described above with respect to FIG. 8A, various embodiments of the present invention may both perform this task automatically and alert the user to any problematic synthesized property values. In particular, the net property synthesizer 212 may provide such alerts in the synthesized net property report 214 itself, which the user may readily analyze and use to inform modifications to the package models 202a–n.

In addition to alerting the package designer to problematic synthesized property values, the net property synthesizer 212 may (as described above with respect to FIG. 8B) assist the package designer in modifying the package design(s) to eliminate the identified problem(s). The net property synthesizer 212 may, for example, inform the package designer of the lengths by which signal nets must be increased so that all signal nets in a group have the same aggregate path length. Such a feature eliminates the need for the package designer to manually calculate such length increases, thereby further simplifying the task of the package designer.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

The various techniques disclosed herein may be combined and/or separated in various ways, as will be apparent to those of ordinary skill in the art. For example, the processes illustrated in FIGS. 5A–5E may be combined in any combination to perform combinations of the functions illustrated therein. As another example, although the process 800es (FIG. 8A) and 850 (FIG. 8B) may be performed after completion of the process 500 (FIG. 5), the processes 500, 800, and 850 may be combined into a single process using techniques that are well-known to those of ordinary skill in the art.

Although the drawings illustrate various data structures as having particular logical structures, these are provided merely for purposes of example and do not constitute limitations of the present invention. Rather, alternative data structures for representing equivalent information and for performing equivalent functions will be apparent to those of ordinary skill in the art. Furthermore, although various data structures (such as the package-specific net property reports, the net property synthesis information 210, and the synthesized net property report 214) are described as being implementable as text files, this is not a limitation of the present invention. Rather, such data structures may be implemented as binary files, database files, or using any appropriate computer-readable format.

Furthermore, although the net property synthesizer 212 and the net property synthesis information 210 are illustrated in FIG. 2 as distinct entities, it should be appreciated that they may be combined or further subdivided. For example, the net property synthesizer 212 may be hard-coded with information contained in the net property synthesis information 210, and the net property synthesis function 216 may be contained in the net property synthesis information 210.

Although the techniques herein are described in the context of IC package design, the present invention is not limited to use in this context. Rather, the techniques disclosed herein may be applied in other contexts, such as on-die routing.

Elements and components described herein may be further divided into additional components or joined together to form fewer components for performing the same functions.

The techniques described above may be implemented, for example, in hardware, software, firmware, or any combination thereof. The net property synthesizer 212 may, for example, be implemented as a computer program. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language. In one embodiment, the net property synthesizer 212 is implemented using the Perl programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a system including a plurality of models of integrated circuit packages, the plurality of models including package-specific values of a property of a plurality of signal nets in the integrated circuit packages, a computer-implemented method comprising steps of:

(A) selecting a first one of the plurality of signal nets;
(B) selecting, from a first one of the plurality of models, a first package-specific value of the property of the first signal net;
(C) selecting, from a second one of the plurality of models, a second package-specific value of the property of the first signal net; and
(D) applying a synthesis function to combine the first and second package-specific values to produce a synthesized property value.

2. The method of claim 1, further comprising steps of selecting a second one of the plurality of signal nets and performing the steps (B), (C), and (D) for the second signal net.

3. The method of claim 1, wherein the plurality of package models comprises a plurality of databases produced by at least two integrated circuit package design tools.

4. The method of claim 1, wherein the plurality of models comprises a plurality of package-specific net property reports produced by at least one integrated circuit package design tool.

5. The method of claim 1, wherein the property comprises signal net path length.

6. The method of claim 5, further comprising a step of:

(E) generating a package-specific propagation delay of the first signal net based on the first package-specific value, a dielectric constant associated with the first one of the plurality of models, and a permeability associated with the first one of the plurality of models.

7. The method of claim 5, wherein the step (D) comprises a step of adding an inter-package distance to the first and second package-specific values to produce the synthesized property value.

8. The method of claim 1, wherein the property comprises signal net propagation delay.

9. The method of claim 1, wherein the synthesis function comprises addition.

10. The method of claim 1, wherein the step (D) comprises steps of:

(D)(1) selecting synthesized property units of measurement;
(D)(2) converting the first package-specific value into the synthesized property units of measurement to produce a first converted value;
(D)(3) converting the second package-specific value into the synthesized property units of measurement to produce a second converted value; and
(D)(4) applying the synthesis function to the first and second converted values to produce the synthesized property value.

11. The method of claim 1, wherein the step (B) comprises steps of:

(B)(1) identifying a first name that is used to identify the first signal net in the first one of the plurality of models; and
(B)(2) selecting the first package-specific value from the first one of the plurality of models based on the first name;

and wherein the step (C) comprises steps of:

(C)(1) identifying a second name that is used to identify the first signal net in the second one of the plurality of models; and
(C)(2) selecting the second package-specific value from the second one of the plurality of models based on the second name;

wherein the first name differs from the second name.

12. The method of claim 1, wherein the step (B) comprises steps of:
- (B)(1) identifying coordinates at which the first signal net connects to a final layer of a package modeled by the first one of the plurality of models; and
- (B)(2) adjusting the first package-specific value based on the coordinates to produce a first adjusted package-specific value; and
- wherein the step (D) comprises a step of applying the synthesis function to the first adjusted package-specific value and the second package-specific value.

13. A system comprising:
- a computer-readable medium tangibly embodying a plurality of models of integrated circuit packages, the plurality of models including package-specific values of a property of a plurality of signal nets in the integrated circuit packages; and
- a net property synthesizer comprising:
  - signal net selection means for selecting a first one of the plurality of signal nets;
  - first value selection means for selecting, from a first one of the plurality of models, a first package-specific value of the property of the first signal net;
  - second value selection means for selecting, from a second one of the plurality of models, a second package-specific value of the property of the first signal net; and
  - synthesis means for applying a synthesis function to combine the first and second package-specific values to produce a synthesized property value.

14. The system of claim 13, wherein the net property synthesizer further comprises means for selecting a second one of the plurality of signal nets and means for applying the first value selection means, the second value selection means, and the synthesis means to the second signal net.

15. The system of claim 13, wherein the plurality of package models comprises a plurality of databases produced by at least two integrated circuit package design tools.

16. The system of claim 13, wherein the plurality of models comprises a plurality of package-specific net property reports produced by at least one integrated circuit package design tool.

17. The system of claim 13, wherein the property comprises signal net path length.

18. The system of claim 17, further comprising:
- means for generating a package-specific propagation delay of the first signal net based on the first package-specific value, a dielectric constant associated with the first one of the plurality of models, and a permeability associated with the first one of the plurality of models.

19. The system of claim 17, wherein the synthesis means comprises means for adding an inter-package distance to the first and second package-specific values to produce the synthesized property value.

20. The system of claim 13, wherein the property comprises signal net propagation delay.

21. The system of claim 13, wherein the synthesis function comprises addition.

22. The system of claim 13, wherein the synthesis means comprises:
- means for selecting synthesized property units of measurement;
- means for converting the first package-specific value into the synthesized property units of measurement to produce a first converted value;
- means for converting the second package-specific value into the synthesized property units of measurement to produce a second converted value; and
- means for applying the synthesis function to the first and second converted values to produce the synthesized property value.

23. The system of claim 13, wherein the first value selection means comprises:
- means for identifying a first name that is used to identify the first signal net in the first one of the plurality of models; and
- means for selecting the first package-specific value from the first one of the plurality of models based on the first name;
- and wherein the second value selection means comprises:
  - means for identifying a second name that is used to identify the first signal net in the second one of the plurality of models; and
  - means for selecting the second package-specific value from the second one of the plurality of models based on the second name;
- wherein the first name differs from the second name.

24. The system of claim 13, wherein the first value selection means comprises:
- means for identifying coordinates at which the first signal net connects to a final layer of a package modeled by the first one of the plurality of models; and
- means for adjusting the first package-specific value based on the coordinates to produce a first adjusted package-specific value; and
- wherein the synthesis means comprises means for applying the synthesis function to the first adjusted package-specific value and the second package-specific value.

* * * * *